United States Patent
Dai et al.

(10) Patent No.: US 8,828,533 B2
(45) Date of Patent: Sep. 9, 2014

(54) MESOPOROUS CARBON MATERIALS

(75) Inventors: Sheng Dai, Knoxville, TN (US);
Pasquale Fernando Fulvio, Knoxville, TN (US); Richard T. Mayes, Knoxville, TN (US); Xiqing Wang, Mason, OH (US); Xiao-Guang Sun, Knoxville, TN (US); Bingkun Guo, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 126 days.

(21) Appl. No.: 13/349,162

(22) Filed: Jan. 12, 2012

(65) Prior Publication Data
US 2013/0183511 A1 Jul. 18, 2013

(51) Int. Cl.
*B32B 5/30* (2006.01)
*C08G 14/02* (2006.01)
*C08G 14/04* (2006.01)
*C01B 31/00* (2006.01)

(52) U.S. Cl.
USPC ............... 428/317.9; 428/315.5; 428/315.7; 521/180; 521/186; 264/29.1; 264/41; 264/45.1; 252/502; 977/779; 977/742; 977/735

(58) Field of Classification Search
USPC ............. 428/317.9, 315.5, 315.7; 252/502; 977/779, 742, 735; 521/180, 186; 264/29.1, 41, 45.1
See application file for complete search history.

(56) References Cited

U.S. PATENT DOCUMENTS

| | | | |
|---|---|---|---|
| 4,439,349 A | 3/1984 | Everett et al. | |
| 5,636,437 A | 6/1997 | Kaschmitter et al. | |
| 5,776,633 A | 7/1998 | Mrotek et al. | |
| 5,932,185 A | 8/1999 | Pekala et al. | |
| 5,954,937 A | 9/1999 | Farmer | |
| 6,214,204 B1 | 4/2001 | Gadkaree et al. | |
| 6,309,532 B1 | 10/2001 | Tran et al. | |
| 6,778,378 B1 | 8/2004 | Andelman | |
| 7,449,165 B2 | 11/2008 | Dai et al. | |
| 7,766,981 B2 | 8/2010 | Bourcier et al. | |
| 7,835,137 B2 | 11/2010 | Kang et al. | |
| 2006/0057051 A1 | 3/2006 | Dai et al. | |
| 2006/0098389 A1* | 5/2006 | Liu et al. | 361/502 |
| 2006/0116284 A1* | 6/2006 | Pak et al. | 502/180 |
| 2006/0197063 A1* | 9/2006 | Tennison et al. | 252/500 |
| 2007/0253887 A1 | 11/2007 | Foley et al. | |
| 2007/0258879 A1* | 11/2007 | Karles et al. | 423/445 R |
| 2008/0152577 A1 | 6/2008 | Addiego et al. | |
| 2008/0220329 A1* | 9/2008 | Kojima et al. | 429/188 |

(Continued)

OTHER PUBLICATIONS

Jung H., et al., "Capacitive Deionization Characteristics of Nanostructured Carbon Aerogel Electrodes Synthesized Via Ambient Drying", *Desalination*, 216:377-385 (2007).

(Continued)

*Primary Examiner* — Hai Vo
(74) *Attorney, Agent, or Firm* — Scully, Scott, Murphy & Presser, P.C.

(57) ABSTRACT

A conductive mesoporous carbon composite comprising conductive carbon nanoparticles contained within a mesoporous carbon matrix, wherein the conductive mesoporous carbon composite possesses at least a portion of mesopores having a pore size of at least 10 nm and up to 50 nm, and wherein the mesopores are either within the mesoporous carbon matrix, or are spacings delineated by surfaces of said conductive carbon nanoparticles when said conductive carbon nanoparticles are fused with each other, or both. Methods for producing the above-described composite, devices incorporating them (e.g., lithium batteries), and methods of using them, are also described.

38 Claims, 21 Drawing Sheets

(56) References Cited

U.S. PATENT DOCUMENTS

| | | | |
|---|---|---|---|
| 2008/0274407 A1 | 11/2008 | Bourcier et al. | |
| 2009/0141422 A1 | 6/2009 | Bourcier | |
| 2009/0208780 A1 | 8/2009 | Sun et al. | |
| 2009/0272946 A1* | 11/2009 | Lu | 252/511 |
| 2009/0305138 A1 | 12/2009 | Baca et al. | |
| 2009/0320253 A1 | 12/2009 | Bourcier et al. | |
| 2010/0033902 A1* | 2/2010 | Cadek et al. | 361/502 |
| 2010/0203391 A1* | 8/2010 | Lopatin et al. | 429/231.8 |
| 2011/0255212 A1* | 10/2011 | Liu et al. | 361/502 |
| 2012/0068171 A1* | 3/2012 | Yamana et al. | 257/40 |

OTHER PUBLICATIONS

Pekala R.W., et al., "Carbon Aerogels for Electrochemical Applications", *Journal of Non-Crystalline Solids* 225:74-80 (1998).

Carriazo D., et al., "Block-Copolymer Assisted Synthesis of Hierarchical Carbon Monoliths Suitable as Supercapacitor Electrodes", *Journal of Materials Chemistry* 20:773-780 (2010).

Portet C. et al., "Electrochemical Performance of Carbon Onions, Nanodiamonds, Carbon Black and Multiwalled Nanotubes in Electrical Double Layer Capacitors", *Carbon* 45:2511-2518 (2007).

Wang X. et al., "Facile Synthesis of Ordered Mesoporous Carbons with High Thermal Stability by Self-Assembly of Resorcinol-Formaldehyde and Block Copolymers Under Highly Acidic Conditions", *Langmuir* 24(14):7500-7505 (2008).

Jaroniec M. et al., "Improvement of the Kruk-Jaroniec-Sayari Method for Pore Size Analysis of Ordered Silicas With Cylindrical Mesopores", *Langmuir* 22 (16):6757-6760 (2006).

Huang Y. et al., "Highly Ordered Mesoporous Carbonaceous Frameworks from a Template of a Mixed Amphiphilic Triblock-Copolymer System of PEO-PPO-PEO and Reverse PPO-PEP-PPO", *Chemistry an Asian Journal* 2:1282-1289 (2007).

Huang Y., et al., "One-Step Hydrothermal Synthesis of Ordered Mesostructured Carbonaceous Monoliths With Hierarchical Porosities", *Chem. Commun.* pp. 2641-2643 (2008).

Xu P., et al., "Treatment of Brackish Produced Water Using Carbon Aerogel-Based Capacitive Deionization Technology", *Water Research* 42:2605-2617 (2008).

Portet C. et al., "Electrochemical Characterizations of Carbon Nanomaterials by the Cavity Microelectrode Technique", *Electrochimica Acta* 53:7675-7680 (2008).

Fulvio P.F. et al., ""Brick-and-Mortar" Self-Assembly Approach to Graphitic Mesoporous Carbon Nanocomposites", *Advanced Functional Materials* 21:2208-2215 (2011), along with Supporting Information (4 pages).

Guo B. et al., "Soft-Templated Mesoporous Carbon—Carbon Nanotube Composites for High Performance Lithium-Ion Batteries", *Advanced Materials* 23:4661-4666 (2011), along with Supporting Information (5 pages).

Zhou H. et al., "A Self-Ordered, Crystalline-Glass, Mesoporous Nanocomposite for Use as a Lithium-Based Storage Device With Both High Power and High Energy Densities", *Angew. Chem. Int. Ed.* 44:797-802 (2005).

Warren S.C. et al., "Ordered Mesoporous Materials from Metal Nanoparticle-Block Copolymer Self-Assembly", *Science* 320:1748-1752 (Jun. 27, 2008).

Pandolfo A.G. et al., "Carbon Properties and Their Role in Supercapacitors", *Journal of Power Sources* 157:11-27 (2006).

Korenblit Y. et al., "High-Rate Electrochemical Capacitors Based on Ordered Mesoporous Silicon Carbide-Derived Carbon", *ACSNANO* 4(3):1337-1344 (2010).

Frackowiak E. et al., "Carbon Materials for the Electrochemical Storage of Energy in Capacitors", *Carbon* 39:937-950 (2001).

Simon P. et al., "Materials for Electrochemical Capacitors", *Nature Materials* 7:845-854 (Nov. 2008).

Pech D. et al., "Ultrahigh-Power Micrometre-Sized Supercapacitors Based on Onion-Like Carbon", *Nature Nanotechnology* 5:651-654 (Sep. 2010).

Simon P. et al., "Charge Storage Mechanism in Nanoporous Carbons and its Consequence for Electrical Double Layer Capacitors", *Philosophical Transactions of the Royal Society A* 368:3457-3467 (2010).

Lee J. et al., "Recent Progress in the Synthesis of Porous Carbon Materials", *Advanced Materials* 18(16):2073-2094 (2006).

Zhang F. et al., "A Facile Aqueous Route to Synthesize Highly Ordered Mesoporous Polymers and Carbon Frameworks with *Ia*3d Bicontinuous Cubic Structure", *J. Am. Chem. Soc.* 127(39):13508-13509 (2005).

Liang C. et al., "Synthesis of a Large-Scale Highly Ordered Porous Carbon Film by Self-Assembly of Block Copolymers", *Angew. Chem. Int. Ed.* 43:5785-5789 (2004).

Liang C. et al., "Mesoporous Carbon Materials: Synthesis and Modification", *Angew. Chem. Int. Ed.* 47:3696-3717 (2008).

Liu C. et al., "Facile Synthesis of Ordered Mesoporous Carbons from F108/Resorcinol-Formaldehyde Composites Obtained in Basic Media", *Chem. Commun.*, pp. 757-759 (2007).

Ryoo R. et al., "Ordered Mesoporous Carbons", *Advanced Materials* 13(9):677-681 (2001).

Liang C. et al., "Synthesis of Mesoporous Carbon Materials Via Enhanced Hydrogen-Bonding Interaction", *Journal of the American Chemical Society* 128(16):5316-5317 (2006).

Tanaka S. et al., "Synthesis of Ordered Mesoporous Carbons with Channel Structure from an Organic-Organic Nanocomposite", *Chem. Commun.*, pp. 2125-2127 (2005).

Meng Y. et al., "Ordered Mesoporous Polymers and Homologous Carbon Frameworks: Amphiphilic Surfactant Templating and Direct Transformation", *Angew. Chem. Int. Ed.* 44(43):7053-7059 (2005).

Huang Y. et al., "Formation of Mesoporous Carbon With a Face-Centered-Cubic Fd3m Structure and Bimodel Architectural Pores from the Reverse Amphiphilic Triblock Copolyer PPO-PEO-PPO", *Angew. Chem. Int. Ed.* 46:1089-1093 (2007).

Wang X., et al., "Preparation of Activated Mesoporous Carbons for Electrosorption of Ions from Aqueous Solutions", *Journal of Materials Chemistry* 20:4602-4608 (2010).

Mayes R.T, et al., "Hierarchical Ordered Mesoporous Carbon from Phloroglucinol-Glyoxal and its Application in Capacitive Deionization of Brackish Water", *Journal of Materials Chemistry* 20:8674-8678 (2010).

Adelhelm P., et al., "Generation of Hierarchical Meso- and Macroporous Carbon from Mesophase Pitch by Spinodal Decomposition using Polymer Templates", *Adv. Mater.* 19:4012-4017 (2007).

Liang C., et al., "Dual Phase Separation for Synthesis of Bimodal Meso-/Macroporous Carbon Monoliths", *Chem. Mater.* 21:2115-2124 (2009).

Zhang F., et al., "An Aqueous Cooperative Assembly Route to Synthesize Ordered Mesoporous Carbons with Controlled Structures and Morphology", *Chem. Mater.* 18:5279-5288 (2006).

Hou C-H., et al., "Electrosorption Capacitance of Nanostructured Carbon-Based Materials", *Journal of Colloid and Interface Science* 302:54-61 (2006).

Ramires E.C., et al., "Biobased Composites from Glyoxal-Phenolic Resins and Sisal Fibers", *Bioresource Technology* 101:1998-2006 (2010).

Kudo H., et al., "Molecular Waterwheel (Noria) from a Simple Condensation of Resorcinol and an Alkanedial", *Angew. Chem. Int. Ed.* 45:7948-7952 (2006).

* cited by examiner

MESOPOROUS CARBON MATERIALS

This invention was made with government support under Prime Contract No. DE-AC05-00OR22725 awarded by the U.S. Department of Energy. The government has certain rights in the invention.

FIELD OF THE INVENTION

The present invention relates to the field of porous carbon materials, and more particularly, to mesoporous carbon materials and films.

BACKGROUND OF THE INVENTION

Mesoporous carbon materials have found an increasing number of utilities, e.g., in gas separation, water purification (i.e., nanofiltration), catalyst support, and energy storage and conversion. More recently, there has been interest in applying mesoporous carbon materials as advanced electrode materials, particularly as capacitive, supercapacitive, and battery electrode (e.g., lithium-ion) materials.

At least one continuing impediment in using conventional mesoporous carbon materials in electrode applications has been their less than optimal conductivity. In efforts to improve the conductivity, graphitizable carbon precursors in the presence of organizing templates have been subjected to thermal treatments well above 2000° C. in order to increase the graphitization of the carbon material. Both soft-template (i.e., organic templates and carbon precursors) and hard-template (e.g., silica template) methods have been used, but without much success in substantially increasing the conductivity (e.g., to a conductivity approaching that of graphite) while at the same time substantially preserving the mesopores, as well as the space-ordering and size distribution of the mesopores, in the resulting mesoporous carbon material. In particular, it has been found that such high-temperature thermal treatments generally cause collapse of the mesoporous architecture. Moreover, the existing methods are not amenable for selectively adjusting the pore size and pore size distribution.

There would be a substantial benefit in a method capable of producing a highly conductive mesoporous carbon material that contains mesopores that have not been collapsed. Since hard-templating methods have the significant drawback of generally requiring harsh and abrasive chemicals to remove the refractive inorganic template, there would be a further benefit in such a method that employs a soft-templating process rather than a hard-templating process. There would be a further benefit in such a method that produces a highly conductive mesoporous carbon material with larger mesopores than conventionally produced (e.g., at least 10 nm) in a predominant amount. A further benefit in such a method would be the ability of the method to selectively adjust the pore size and pore size distribution.

SUMMARY OF THE INVENTION

In one aspect, the invention is directed to a mesoporous carbon composite produced according to the method described herein. The mesoporous carbon composite described herein is highly conductive (e.g., on the order of graphite itself) and includes a population or distribution of mesopores that are not collapsed. The produced carbon composite is also highly robust and resistant to shrinkage of the mesoporous framework during thermal treatments. Moreover, it has herein been unexpectedly found that inclusion of highly conductive (e.g., graphitic) carbon nanoparticles not only favorably impacts the conductivity of the resulting mesoporous carbon, but the presence of the conductive carbon nanoparticles unexpectedly causes a favorable enlargement in the pore size of a mesoporous carbon material. In particular, the mesoporous carbon material described herein possesses at least a portion of mesopores that are larger than mesopores found in conventional mesoporous carbon materials, e.g., a pore size of at least 10, 12, or 15 nm, and wherein such larger mesopore sizes are preferably in a predominant amount, e.g., at least 80%, 85%, 90%, or 95% of the total volume attributed to such larger mesopores.

More specifically, the conductive mesoporous carbon composite includes conductive carbon nanoparticles contained within a mesoporous carbon matrix, wherein mesopores (generally 2-50 nm in pore diameter) are present in at least the mesoporous carbon matrix, and may also be present as spacings delineated by surfaces of the conductive carbon nanoparticles when the conductive carbon nanoparticles are fused with each other. At least a portion of the mesopores has a size of at least 10 nm. The mesopores having a size of at least 10 nm are either within the mesoporous carbon matrix, or are spacings delineated by surfaces of the conductive carbon nanoparticles when the conductive carbon nanoparticles are fused with each other, or both. In particular embodiments, the conductive mesoporous carbon material possesses at least a bimodal pore size distribution, wherein a first mode of mesopores has a pore size ranging from 2 to 8 nm and is present in the mesoporous carbon matrix, and wherein a second mode of mesopores has a pore size of at least 10 nm and is attributed to spacings between the conductive carbon nanoparticles. In further embodiments, the second mode of mesopores contributes at least 80%, 85%, or 90% of the total pore volume.

In another aspect, the invention is directed to a method for fabricating the conductive mesoporous carbon composite described above. The method is a modified soft-templating process in which highly conductive carbon nanoparticles (i.e., "bricks") are incorporated in a carbon (organic) matrix precursor composition (i.e., "mortar"). On carbonization, the organic precursor is converted to a mesoporous carbon matrix in which the conductive carbon nanoparticles are embedded. The conductive carbon nanoparticles impart a significant degree of conductivity to the composite material, which is advantageously accomplished in the absence of a high temperature graphitization step.

More specifically, the method includes subjecting a precursor composition to a curing step followed by a carbonization step, the precursor composition including: (i) a templating component comprised of a block copolymer, (ii) a phenolic component, (iii) a crosslinkable aldehyde component, (iv) an acid catalyst, and (v) conductive carbon nanoparticles. The carbonization step includes heating the precursor composition at a carbonizing temperature of at least or above 300° C. or 400° C. and less than or up to 2000° C., 1800° C., or 1500° C. for sufficient time to convert the precursor composition to a conductive mesoporous carbon composite. At least a portion of mesopores in the conductive mesoporous carbon composite has a pore size of at least or above 10 nm, 12 nm, or 15 nm. In particular embodiments, the carbonizing temperature is no more than 1200° C., 1000° C., 900° C., 850° C., or 800° C.

By virtue of the instant methodology, a high level of conductivity is advantageously provided by inclusion of the conductive carbon particles at the start (i.e., in the precursor), which permits attainment of a high conductivity without relying on a high thermal treatment step for inducing graphitization. The instant method also advantageously produces a highly conductive mesoporous carbon material with larger mesopores than conventionally produced (e.g., at least 10, 12, or 15 nm in pore size). A further advantage of the method is its amenability for selectively adjusting the pore size and pore size distribution of the finally produced carbon material.

DETAILED DESCRIPTION OF THE INVENTION

Figure 1:
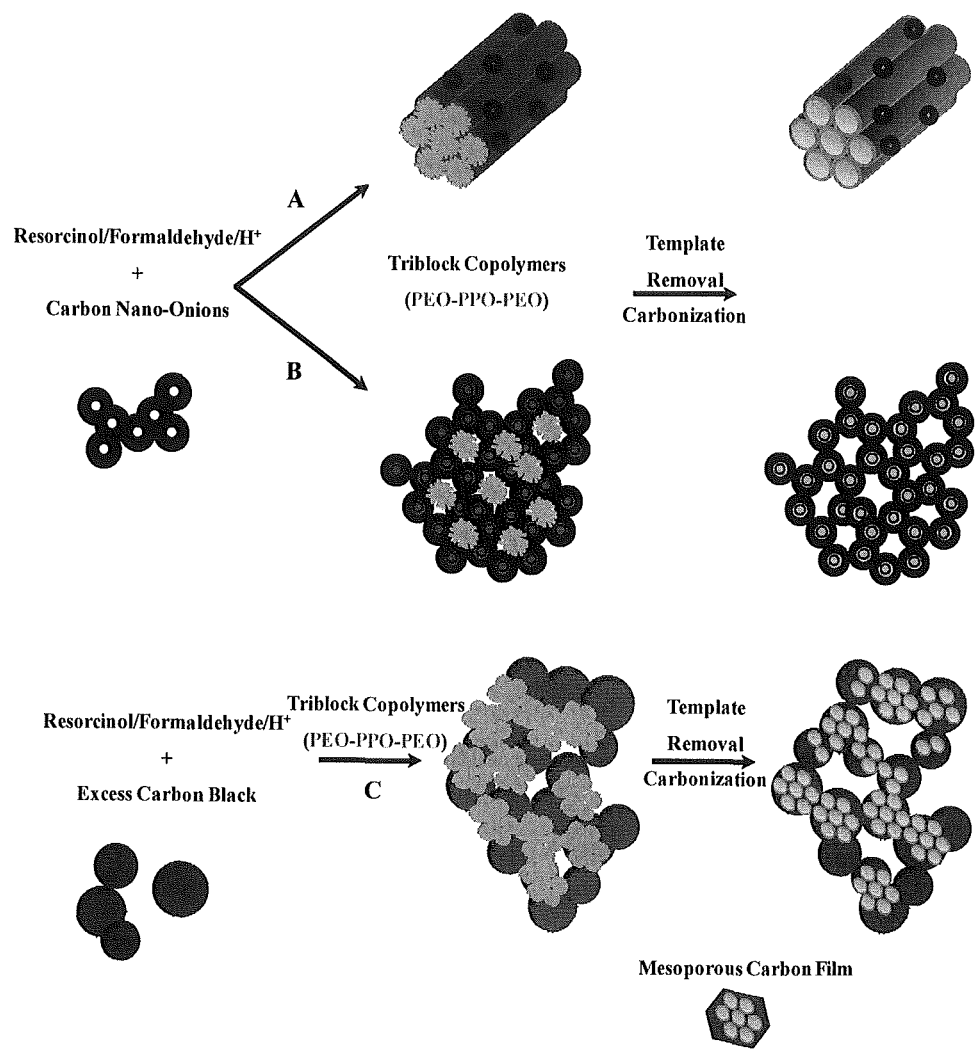
FIG. 1. Schemes showing proposed self-assembly mechanism of carbon onion (CO-x) and carbon black (CB-x) nanocomposites using excess resorcinol-formaldehyde (flow A), excess carbon onion (flow B), and excess carbon black (flow C).

In one aspect, the invention is directed to a conductive mesoporous carbon composite having conductive carbon nanoparticles contained within (i.e., embedded in) a mesoporous carbon matrix. As used herein and as understood in the art, the term "mesoporous" indicates a material containing "mesopores," which are pores having a diameter (i.e., pore size) of 2 to 50 nm. In contrast to mesopores, micropores (and thus, microporous materials) are generally understood to have pore diameters less than 2 nm, whereas macropores (and thus, macroporous materials) are generally understood to have pore diameters greater than 50 nm.

Particularly for pores contained in the mesoporous carbon matrix, the pores are generally circular or oval-shaped. For circular or substantially circular pores, the pore size refers to the diameter of the pore. For pores that are substantially unsymmetrical or irregularly shaped (as may occur particularly for pores delineated by surfaces of conductive carbon nanoparticles), the pore size generally refers to either the average of the pore dimensions for a particular pore, or to the average or longest dimension of such pores averaged over a population of such pores. The wall thickness of mesopores in the mesoporous carbon matrix is generally within the range of about 5-10 nm, e.g., 5, 5.5, 6, 6.5, 7, 7.5, 8, 8.5, 9, 9.5, or 10 nm, but may also be greater than 10 nm, such as 12 nm, 15 nm, 18 nm, 20 nm, 25 nm, 30 nm, 35 nm, 40 nm, 45 nm, or 50 nm, or within a range bounded by any two of these values.

The conductive carbon nanoparticles are any of the carbon particles known in the art that are conductive, generally by virtue of a graphitic structure, and are nanosized in at least one, two, or all three of their size dimensions. The term "nanosized" or "nanosize" as used herein refers to a size in at least one dimension of less than 1 micron, and more typically, a size up to or less than 500 nm, 250 nm, or 100 nm. In different embodiments, the conductive carbon nanoparticles have a uniform or average size of precisely, about, up to, or less than, for example, 1 nm, 2 nm, 5 nm, 10 nm, 20 nm, 30 nm, 40 nm, 50 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, or 950 nm, or a size within a range bounded by any two of the foregoing values, or between any of the foregoing values and less than 1 micron. The exemplary sizes given above for nanoparticles may refer to primary or secondary (agglomerated) particle sizes, except that for purposes of the instant invention a secondary particle size remains under 1 micron. Particularly when any of the exemplary sizes provided above refer to an average size, there is the possibility that a minor portion (i.e., less than 1, 2, or 5% by total weight) of carbon particles having a size greater than 1 micron may be present. However, preferably, the conductive carbon particles do not include particles having a size of 1 micron or greater. In embodiments where less than all three size dimensions are nanosized, the remaining one or two size dimensions can have a size up to or less than, for example, 2 microns, 5 microns, 10 microns, 25 microns, 50 microns, 100 microns, 250 microns, 500 microns, or 1000 microns (1 mm). The carbon nanoparticles may also be porous or non-porous.

As used herein, the term "about" generally indicates within ±0.5%, 1%, 2%, 5%, or up to ±10% of the indicated value. For example, a pore size of "about 10 nm" generally indicates, in its broadest sense, 10 nm±10%, which indicates 9.0-11.0 nm. In addition, the term "about" can indicate either a measurement error (i.e., by limitations in the measurement method), or alternatively, a variation or average in a physical characteristic of a group (e.g., a population of pores).

Some examples of conductive carbon nanoparticles include carbon black ("CB"), carbon onion ("CO"), a spherical fullerene (e.g., buckminsterfullerene, i.e., $C_{60}$, as well as any of the smaller or larger buckyballs, such as $C_{20}$ or $C_{70}$), a tubular fullerene (e.g., single-walled, double-walled, or multi-walled carbon nanotubes), carbon nanodiamonds, and carbon nanobuds, all of which have compositions and physical and electrical properties well-known in the art. For purposes of the instant invention, when a carbon black is used, it is a conductive carbon black, such as an acetylene black. In the case of carbon nanodiamonds, these are generally electronic insulators and good thermal conductors, unless they are thermally treated above 1000° C., under which condition a graphitization process begins from the outer layers to the interior of the nanodiamond particles. Nanodiamonds with a graphitic outer shell are electronic conductors. As known in the art, fully graphitized carbon nanodiamonds can be considered to be carbon onions.

In some embodiments, the conductive carbon nanoparticles are made exclusively of carbon, while in other embodiments, the conductive carbon nanoparticles can include an amount of one or a combination of non-carbon non-hydrogen (i.e., hetero-dopant) elements, such as nitrogen, oxygen, sulfur, boron, phosphorus, or a metal, such as an alkali metal (e.g., lithium), alkaline earth metal, transition metal, main group metal (e.g., Al, Ga, or In), or rare earth metal, as long as the conductive carbon nanoparticles remain substantially conductive (i.e., on the order of graphite, or useful as an electrode material), and as long as the presence of one or more hetero elements does not substantially obviate the resulting mesoporous carbon composite from functioning according to its intended use. The amount of hetero element can be a minor amount (e.g., up to 0.1, 0.5, 1, 2, or 5 wt % or mol %) or a more substantial amount (e.g., about, at least, or up to 10, 15, 20, 25, 30, 40, or 50 wt % or mol %). In some embodiments, any one or more of the specifically recited classes or specific types of carbon nanoparticles or any one or more of the specifically recited classes or specific types of hetero-dopant elements are excluded from the carbon nanoparticles, the matrix, or the mesoporous carbon composite altogether. Generally, the conductive carbon nanoparticles have a graphite structure or partial graphite structure, but non-graphitic conductive carbon structures, such as a conductive metal carbide (e.g., SiC and WC) are also included herein.

By being "embedded" in the mesoporous carbon matrix is meant that the conductive carbon nanoparticles are at least coated with the mesoporous carbon matrix. The coated conductive carbon nanoparticles are separated from each other by the mesoporous carbon matrix, wherein the separation distance (matrix interspacing) can be miniscule, i.e., as a coating (e.g., up to 0.5, 1, 2, 5, or 10 nm), intermediate (e.g., greater than 10 nm, and up to 50 nm, 100 nm, or 200 nm), or substantial (e.g., greater than 200 nm, and up to 500 nm, 1 micron, 10 microns, 50 microns, 100 microns, 500 microns, or 1 mm).

In some embodiments, the mesoporous carbon composite contains conductive carbon nanoparticles surrounded by intermediate or substantial interspacings of the mesoporous carbon matrix, and all mesopores of the composite are attributed to mesopores in the mesoporous carbon matrix. Mesopores contained within the mesoporous carbon matrix have pore walls and pore-pore interspacings constructed of the carbon matrix material. In other embodiments, for any of the matrix interspacings considered above (and particularly for miniscule and intermediate interspacings), the mesoporous carbon composite contains a portion of mesopores within the mesoporous carbon matrix and a portion of mesopores completely or substantially delineated by surfaces of closely interconnected (bonded) carbon nanoparticles. Mesopores delineated by surfaces of bonded carbon nanoparticles have pore walls constructed of carbon nanoparticles coated with carbon matrix material. Thus, the mesopores are present in at least the mesoporous carbon matrix, and may also be present as spacings delineated by surfaces of the conductive carbon nanoparticles when the conductive carbon nanoparticles are bonded or fused with each other. A mesoporous carbon composite containing a higher content of carbon nanoparticles will generally contain a greater number of mesopores delineated by surfaces of bonded carbon nanoparticles compared to a mesoporous carbon composite containing a lower content of carbon nanoparticles. In some embodiments, a mesoporous carbon composite containing a low enough content of carbon nanoparticles is absent of mesopores delineated by surfaces of bonded carbon nanoparticles. FIG. 1 shows some examples of these different types of mesopores.

At least a portion of the mesopores has a size of at least 10 nm. In different embodiments, at least a portion of the mesopores has a size of precisely, about, or at least 10 nm, 12 nm, 15 nm, 18 nm, 20 nm, 22 nm, 25 nm, 30 nm, 35 nm, or 40 nm, or a size within a range bounded by any two of the foregoing values. The mesopores having a size of at least 10 nm are either within the mesoporous carbon matrix, or are spacings delineated by surfaces of the conductive carbon nanoparticles when the conductive carbon nanoparticles are bonded with each other, or both.

In one set of embodiments, a single distribution of mesopores is present in the mesoporous carbon composite. In the latter case, the single distribution of mesopores necessarily includes the mesopores having a size of at least 10 nm. A distribution (or "mode") of pores is generally defined by a single pore size of maximum (peak) pore volume concentration. Alternatively, the mesoporous carbon composite may have a bimodal, trimodal, or higher multimodal mesopore size distribution, which can be identified by the presence of, respectively, two, three, or a higher number of peak mesopore volume concentrations associated with, respectively, one, two, three, or a higher number of individual mesopore size distributions bounded on each end by a minimum mesopore size and a maximum mesopore size. The pore size distributions can be overlapping or non-overlapping. For example, the mesoporous carbon composite can include a monomodal, bimodal, trimodal, or higher multimodal mesopore size distribution, wherein each mesopore size distribution is bounded by a minimum mesopore size and maximum mesopore size selected from 2 nm, 3 nm, 4 nm, 5 nm, 6 nm, 7 nm, 8 nm, 9 nm, 10 nm, 12 nm, 15 nm, 20 nm, 25 nm, 30 nm, 35 nm, 40 nm, 45 nm, and 50 nm, wherein at least one of the mesopore size distributions includes a pore size of at least 10 nm, as discussed above. The one, two, three, or higher number of mesopore size distributions may all be within the mesoporous carbon matrix, or they may all be as spacings delineated by surfaces of the conductive carbon nanoparticles when the conductive carbon nanoparticles are bonded with each other, or one or more of the mesopore size distributions may be within the mesoporous carbon matrix and one or more as spacings delineated by surfaces of the conductive carbon nanoparticles. Any of the exemplary mesopore sizes provided above can also be taken as a pore size of peak pore volume concentration associated with a particular pore size distribution.

In some embodiments, micropores (i.e., pore sizes less than 2 nm) are also present in the mesoporous carbon composite. Generally, micropores, when present, are found exclusively in the mesoporous carbon matrix. When micropores are present, any of the exemplary mesopore size distributions provided above can be extended below 2 nm, e.g., to 1 nm or 0.5 nm. In some embodiments, micropores may be desirable, whereas in other embodiments, micropores may be not desirable. Micropores may be particularly desirable when the carbon composite is directed to an energy storage application, such as a supercapacitor. In such applications, the larger the micropore volume, the higher the amount of charges that can be stored in these materials. However, micropores may be particularly undesirable when the carbon composite is directed to a liquid flow separation process, because micropores tend to get filled quickly and can substantially hinder the flow of liquid. In different embodiments, the pore volume attributed to micropores is about, up to, less than, or at least, for example, 0.1%, 0.5%, 1%, 2%, 5%, 10%, 15%, 20%, 25%, 30%, 35%, 40%, or 45% of the total pore volume, or a pore volume within a range bounded by any two of the foregoing values.

In some embodiments, macropores (i.e., pore sizes greater than 50 nm) are also present in the mesoporous carbon composite. Macropores, when present, can be found either in the mesoporous carbon matrix or as spacings delineated by surfaces of the conductive carbon nanoparticles when the conductive carbon nanoparticles are bonded with each other. In some embodiments, macropores may be desirable, whereas in other embodiments, macropores may be not desirable. Macropores may be particularly desirable, in some cases, when the carbon composite is directed to a liquid flow separation process, since the larger pores allow for a faster flow rate. When macropores are present, any of the exemplary mesopore size distributions described above can be extended above 50 nm, e.g., up to 55 nm, 60 nm, 65 nm, 70 nm, 75 nm, 80 nm, 85 nm, 90 nm, 95 nm, 100 nm, 120 nm, 150 nm, 180 nm, or 200 nm. In different embodiments, the pore volume attributed to macropores is about, up to, less than, or at least, for example, 0.1%, 0.5%, 1%, 2%, 5%, 10%, 15%, 20%, 25%, 30%, 35%, 40%, 45%, or 50% of the total pore volume, or a pore volume within a range bounded by any two of the foregoing values.

In some embodiments, the mesoporous carbon composite contains only mesopores (i.e., 100% pore volume attributed to mesopores), while in other embodiments, the mesoporous carbon composite includes mesopores and micropores, or mesopores and macropores, or a combination of mesopores, micropores, and macropores. When mesopores are in combination with micropores and/or macropores, the percent pore volume of each pore size range can be any suitable amount, e.g., precisely, about, at least, up to, or less than 1%, 2%, 5%, 10%, 15%, 20%, 25%, 30%, 35%, 40%, 45%, 50%, 55%, 60%, 65%, 70%, 75%, 80%, 85%, 90%, 95%, 98%, or 99% percent pore volume, wherein it is understood that the total percent pore volume sums to 100%. Similarly, particular pore size sub-ranges within the mesopore size range (or within the micropore or macropore size range, if present) can have their own percent pore volumes, such as any of those exemplified above. In some embodiments, micropores and/or macropores, or mesopores of a particular size, are substantially or completely absent. The term "substantially absent" for a particular pore size or pore size range generally means that the indicated pore size or pore size range contributes less than 1%, or up to or less than 0.5%, 0.2%, or 0.1% percent pore volume. The term "completely absent" for a particular pore size or pore size range generally means that the indicated pore size or pore size range is not detectable (i.e., not present even in a substantially minor amount).

In particular embodiments, the mesoporous carbon composite possesses at least a bimodal pore size distribution with at least a first mode and a second mode of pores, wherein the first mode of pores is present in the mesoporous carbon matrix and has a pore size ranging from 2 to 8 nm (or a pore size of 2 nm, 3 nm, 4 nm, 5 nm, 6 nm, 7 nm, or 8 nm, or a pore size within a range bounded by any two of these values), and the second mode of pores (or more particularly, mesopores) is attributed to spacings delineated by surfaces of the conductive carbon nanoparticles when the conductive carbon nanoparticles are bonded with each other and has a pore size of at least 10 nm (or a pore size of 10 nm, 11 nm, 12 nm, 15 nm, 18 nm, 20 nm, 25 nm, 30 nm, 35 nm, or 40 nm, or a pore size within a range bounded by any two of these values). The at least two modes of pores can have any suitable percent pore volume, such as any of the exemplary percent pore volumes provided above. However, in particular embodiments, the second mode of mesopores contributes at least 50%, 55%, 60%, 65%, 70%, 75%, 80%, 85%, 90%, 95%, or 98% of the total pore volume. In other embodiments, the second mode of mesopores contributes up to or less than 50%, 45%, 40%, 35%, 30%, 25%, 20%, 15%, 10%, 5%, 2%, or 1% of the total pore volume.

The pores of the mesoporous carbon composite can also possess a level of uniformity, generally either in pore diameter, pore shape, and/or pore interspacing. In particular embodiments, the pores of the mesoporous carbon composite may possess an average pore size corresponding to any of the pore sizes exemplified above, subject to a degree of variation of no more than, for example, ±10 nm, ±8 nm, ±6, nm, ±5 nm, ±4 nm, ±3 nm, ±2 nm, ±1 nm, or ±0.5 nm. The size or shape uniformity can be only for pores present in the mesoporous carbon matrix, or only for pores delineated by bonded carbon nanoparticles, or for both sets of pores, if both are present. If both sets of pores are present, the two sets of pores may be uniform in size or shape regardless of whether the two sets of pores are the same or different in pore size or shape. Particularly for mesopores in the mesoporous carbon matrix, the mesopores may be arranged relative to each other with a certain degree of order (i.e., in a patterned or ordered arrangement). Some examples of ordered arrangements include a hexagonal or cubic arrangement.

The mesoporous carbon composite typically possesses a BET surface area of about or at least 50, 100, 200, 300, 400, 450, 500, 550, 600, 650, 700, 750, or 800 $m^2/g$, or within a range bounded by any two of these values. The mesoporous carbon composite typically possesses a pore volume of about or at least 0.2, 0.25, 0.3, 0.35, 0.4, 0.45, 0.5, 0.55, 0.6, 0.65, or 0.7 $cm^3/g$, or a range between any two of these values.

In one embodiment, the mesoporous carbon composite is in the form of a film. The film can have any suitable thickness. In different embodiments, the film may have a thickness of, at least, up to, or less than 10 nm, 25 nm, 50 nm, 100 nm, 200 nm, 300 nm, 400 nm, 500 nm, 600 nm, 700 nm, 800 nm, 900 nm, 1.0 μm, 1.2 μm, 1.5 μm, 2.0 μm, 2.5 μm, 3.0 μm, 4.0 μm, 5.0 μm, 10 μm, 20 μm, 30 μm, 40 μm, or 50 μm, or a thickness within a range bounded by any of these values. The film may also desirably function as part of a layered composite material, wherein the mesoporous carbon composite film either overlays, underlies, or is sandwiched between one or more layers of another material, wherein the one or more other layers can be useful for such applications as capacitors, batteries (e.g., lithium-ion batteries), catalysts, or an energy storage or conversion device. The one or more layers of another material may be porous or non-porous, and can be composed of, for example, silica, alumina, graphite, a metal oxide, metal sulfide, metal selenide, metal telluride, metal nitride, metal phosphide, or an organic, inorganic, or hybrid polymer, or combination thereof, depending on the particular application.

In another embodiment, the produced mesoporous carbon composite is in the form of particles (i.e., "composite particles"). The composite particles can be nanoparticles, microparticles, or macroscopic particles (e.g., in the millimeter size range). The size of the composite nanoparticles can be any of the nanoparticle sizes provided earlier above, except that the size of the composite particle cannot be smaller than the conductive nanoparticles incorporated in the composite. The size of composite microparticles can be, for example, precisely, at least, up to, or less than 1.0 μm, 1.5 μm, 2.0 μm, 2.5 μm, 3.0 μm, 4.0 μm, 5.0 μm, 10 μm, 20 μm, 30 μm, 40 μm, or 50 μm, or a size within a range bounded by any two of these values, or a size within a range bounded by any of these values and any of the exemplary nanoparticle or macroparticle sizes provided herein. The size of composite macroparticles can be, for example, precisely, at least, up to, or less than 0.1, 0.5, 1, 2, 3, 4, or 5 millimeters, or a size within a range bounded by any two of these values, or a size within a range bounded by any of these values and any of the exemplary nanoparticle or microparticle sizes provided herein.

In some embodiments, at least a portion or all of the mesoporous carbon matrix is non-graphitic, such as amorphous, glassy, or vitreous carbon. Generally, an amorphous portion of the carbon material includes micropores, whereas micropores are generally absent from graphitic portions. In particular embodiments, the mesoporous carbon matrix is no more than, or less than, 70%, 60%, 50%, 40%, 25%, 20%, 15%, 10%, 5%, 2%, or 1% graphitic, or a percentage therebetween. In some embodiments, all (e.g., about or precisely 100%) or substantially all (for example, greater than 90%, 95%, 98%, or 99%) of the porous carbon material is non-graphitic, and may be instead, for example, amorphous or glassy carbon.

The mesoporous carbon composite can have any of a number of other shapes. Some other shapes include rods, cubes, fibers, or sheets, depending on the application.

Most amorphous carbons exhibit resistivity values within 0.5-0.8 Ohm·cm. Graphite has the lowest electrical resistivity, and consequently highest electrical conductivity, perpendicular to its basal plane, i.e., 0.0025-0.005 Ohm·cm, whereas parallel to its basal plane resistivity increases to 3 Ohm·cm. Graphitic carbon nanomaterials, such as carbon black (CB) and carbon onions (CO) exhibit electrical resistivity as low as 0.2-0.5 Ohm·cm (Kuznetsov, V. L., et al., *Chemical Physics Letters* 2001, 336, pp. 397-404). In general, amorphous carbons exhibit resistivity values 2 to 4 times greater than CO and CB. For the composite materials described herein, using the resistivity values calculated using the same method of measurement (electrochemical button cells), CO-x composites can exhibit from 0.6 times the resistivity value of the reference carbon onion (CO—R) material (as in the case of CO-25 composite) to 1.6 times the resistivity value of the reference CO—R material (as in the case of CO-05 composite), whereas CB-x composites can exhibit from 1 time the resistivity value of the reference carbon black (CB—R) material (as in the case of CB-25 composite) to 1.2 times resistivity value of the reference CB—R material (as in the case of CB-05 composite). Hence, the materials prepared according to the present method can exhibit higher electrical conductivities than the graphitic nanomaterials used as starting materials.

In another aspect, the invention is directed to a method for fabricating the conductive mesoporous carbon composite described above. The method first involves providing (i.e., preparing or otherwise obtaining in prepared form) a precursor composition, which is subsequently subjected to a curing step followed by a carbonization step in order to produce the mesoporous carbon composite described above.

The precursor composition includes at least the following components: (i) a templating component containing one or more block copolymers, (ii) one or more phenolic compounds or materials (i.e., "phenolic component"), (iii) one or more crosslinkable aldehyde compounds or materials (i.e., "aldehyde component"), (iv) an acid catalyst, and (v) conductive carbon nanoparticles. The combination of phenolic component and aldehyde component is herein referred to as the "carbon precursor" or "polymer precursor" or "polymer precursor components". The resulting polymer produced from the polymer precursor (i.e., after polymerization and crosslinking of phenolic and aldehyde components) functions as the carbon precursor, which is converted to carbon during a carbonization step. In contrast, the templating component (i.e., block copolymer) functions to organize the polymer precursor materials in an ordered (i.e., patterned) arrangement before the carbonization step. During carbonization, the block copolymer is generally completely volatized into gaseous byproducts, and thereby, generally does not contribute to formation of the solid carbon matrix. However, the volatile gases produced from the block copolymer serve the important role of creating mesopores (and sometimes micropores) in the carbon matrix during the carbonization step. During carbonization, the carbon precursor components (i.e., polymer and aldehyde components), along with templating component, together produce the mesoporous carbon matrix in which the conductive carbon nanoparticles become embedded.

The templating component can contain one or more block copolymers. As used herein, a "block copolymer" is a polymer containing two or more chemically distinct polymeric blocks (i.e., sections or segments). The copolymer can be, for example, a diblock copolymer (e.g., A-B), triblock copolymer (e.g., A-B—C), tetrablock copolymer (e.g., A-B—C-D), or higher block copolymer, wherein A, B, C, and D represent chemically distinct polymeric segments. The block copolymer is preferably not completely inorganic, and more preferably, completely organic (i.e., carbon-based) in order that the block copolymer is at least partially capable of volatilizing during the carbonization step. Preferably, the block copolymer contains at least two segments that possess a difference in hydrophilicity or hydrophobicity (i.e., is amphiphilic). Such block copolymers typically form periodic structures by virtue of selective interactions between like domains, i.e., between hydrophobic domains and between hydrophilic domains. The block copolymer is typically linear; however, branched (e.g., glycerol branching units) and grafted block copolymer variations are also contemplated herein. Preferably, the block copolymer contains polar groups capable of interacting (e.g., by hydrogen or ionic bonding) with the phenolic compound or material. For this reason, the block copolymer is preferably not a complete hydrocarbon such as styrene-butadiene. Some of the groups preferably located in the block copolymer which can provide a favorable interactive bond with phenol groups include, for example, hydroxy, amino, imino, and carbonyl groups.

Some general examples of suitable classes of block copolymers include those containing segments of polyacrylate or polymethacrylate (and esters thereof), polystyrene, polyethyleneoxide, polypropyleneoxide, polyethylene, polyacrylonitrile, polylactide, and polycaprolactone. Some specific examples of suitable block copolymers include polystyrene-b-poly(methylmethacrylate) (i.e., PS-PMMA), polystyrene-b-poly(acrylic acid) (i.e., PS-PAA), polystyrene-b-poly(4-vinylpyridine) (i.e., PS-P4VP), polystyrene-b-poly(2-vinylpyridine) (i.e., PS-P2VP), polyethylene-b-poly(4-vinylpyridine) (i.e., PE-P4VP), polystyrene-b-polyethyleneoxide (i.e., PS-PEO), polystyrene-b-poly(4-hydroxystyrene), polyethyleneoxide-b-polypropyleneoxide (i.e., PEO-PPO), polyethyleneoxide-b-poly(4-vinylpyridine) (i.e., PEO-P4VP), polyethylene-b-polyethyleneoxide (i.e., PE-PEO), polystyrene-b-poly(D,L-lactide), polystyrene-b-poly(methylmethacrylate)-b-polyethyleneoxide (i.e., PS-PMMA-PEO), polystyrene-b-polyacrylamide, polystyrene-b-polydimethylacrylamide (i.e., PS-PDMA), polystyrene-b-polyacrylonitrile (i.e., PS-PAN), and polyethyleneoxide-b-polyacrylonitrile (i.e., PEO-PAN).

In a preferred embodiment, the block copolymer is a triblock copolymer containing one or more poly-EO segments and one or more poly-PPO segments. More preferably, the triblock copolymer is a poloxamer (i.e. Pluronic® or Lutrol® polymer) according to the general formula $$(PEO)_a\text{-}(PPO)_b\text{-}(PEO)_c \tag{1}$$

In Formula (1), PEO is a polyethylene oxide block and PPO is a polypropylene block (i.e., —CH$_2$CH(CH$_3$)O— or —CH(CH$_3$)CH$_2$O—), and the subscripts a, b, and c represent the number of monomer units of PEO and PPO, as indicated. Typically, a, b, and c in Formula (I) are each at least 2, and more typically, at least 5, and typically up to a value of 100, 120, or 130. Subscripts a and c are typically of equal value in these types of polymers. In different embodiments, a, b, and c can independently have a value of about, or at least, or up to 10, 20, 30, 40, 50, 60, 70, 80, 90, 100, 120, 130, 140, 150, 160, 180, 200, 220, 240, or any particular range established by any two of these exemplary values.

In one embodiment, a and c values in Formula (1) are each less than b, i.e., the hydrophilic PEO block is shorter on each end than the hydrophobic PPO block. For example, in different embodiments, a, b, and c can each independently have a value of 2, 5, 7, 10, 12, 15, 20, 25, 30, 35, 40, 45, 50, 55, 60, 65, 70, 75, 80, 85, 90, 95, 100, 110, 120, 130, 140, 150, or 160, or any range delimited by any two of these values, provided that a and c values are each less than b. Furthermore, in different embodiments, it can be preferred for the a and c values to be less than b by a certain number of units, e.g., by 2, 5, 7, 10, 12, 15, 20, 25, 30, 35, 40, 45, or 50 units, or any range therein. Alternatively, it can be preferred for the a and c values to be a certain fraction or percentage of b (or less than or greater than this fraction or percentage), e.g., about 10%, 20%, 25%, 30, 33%, 40%, 50%, 60%, 70%, 75%, 80%, 85%, 90%, or any range delimited by any two of these values.

In another embodiment, a and c values in Formula (1) are each greater than b, i.e., the hydrophilic PEO block is longer on each end than the hydrophobic PPO block. For example, in different embodiments, a, b, and c can each independently have a value of 2, 5, 7, 10, 12, 15, 20, 25, 30, 35, 40, 45, 50, 55, 60, 65, 70, 75, 80, 85, 90, 95, 100, 110, 120, 130, 140, 150, or 160, or any range delimited by any two of these values, provided that a and c values are each greater than b. Furthermore, in different embodiments, it can be preferred for the a and c values to be greater than b by a certain number of units, e.g., by 2, 5, 7, 10, 12, 15, 20, 25, 30, 35, 40, 45, or 50 units, or any range therein. Alternatively, it can be preferred for the b value to be a certain fraction or percentage of a and c values (or less than or greater than this fraction or percentage), e.g., about 10%, 20%, 25%, 30, 33%, 40%, 50%, 60%, 70%, 75%, 80%, 85%, 90%, or any range delimited by any two of these values.

In different embodiments, the poloxamer preferably has a minimum average molecular weight of at least 500, 800, 1000, 1200, 1500, 2000, 2500, 3000, 3500, 4000, or 4500 g/mole, and a maximum average molecular weight of 5000, 5500, 6000, 6500, 7000, 7500, 8000, 8500, 9000, 9500, 10,000, 12,000, 15,000, or 20,000 g/mole, wherein a particular range can be established between any two of the foregoing values, and particularly, between any two of the minimum and maximum values provided. The viscosity of the polymers is generally at least 200, 250, 300, 350, 400, 450, 500, 550, 600, or 650 centipoise (cps), and generally up to 700, 800, 900, 1000, 1500, 2000, 2500, 3000, 3500, 4000, 4500, 5000, 5500, 6000, 6500, 7000, or 7500 cps, or any particular range established between any two of the foregoing values.

The following table lists several exemplary poloxamer polymers applicable to the present invention.

TABLE 1

Some exemplary poloxamer polymers

| Generic Name | Pluronic ® Name | Approximate value of a | Approximate value of b | Approximate value of c |
|---|---|---|---|---|
| Poloxamer 101 | Pluronic L-31 | 2 | 16 | 2 |
| Poloxamer 105 | Pluronic L-35 | 11 | 16 | 11 |
| Poloxamer 108 | Pluronic F-38 | 46 | 16 | 46 |
| Poloxamer 122 | — | 5 | 21 | 5 |
| Poloxamer 123 | Pluronic L-43 | 7 | 21 | 7 |
| Poloxamer 124 | Pluronic L-44 | 11 | 21 | 11 |
| Poloxamer 181 | Pluronic L-61 | 3 | 30 | 3 |
| Poloxamer 182 | Pluronic L-62 | 8 | 30 | 8 |
| Poloxamer 183 | — | 10 | 30 | 10 |
| Poloxamer 184 | Pluronic L-64 | 13 | 30 | 13 |
| Poloxamer 185 | Pluronic P-65 | 19 | 30 | 19 |
| Poloxamer 188 | Pluronic F-68 | 75 | 30 | 75 |
| Poloxamer 212 | — | 8 | 35 | 8 |
| Poloxamer 215 | — | 24 | 35 | 24 |
| Poloxamer 217 | Pluronic F-77 | 52 | 35 | 52 |
| Poloxamer 231 | Pluronic L-81 | 6 | 39 | 6 |
| Poloxamer 234 | Pluronic P-84 | 22 | 39 | 22 |
| Poloxamer 235 | Pluronic P-85 | 27 | 39 | 27 |
| Poloxamer 237 | Pluronic F-87 | 62 | 39 | 62 |
| Poloxamer 238 | Pluronic F-88 | 97 | 39 | 97 |
| Poloxamer 282 | Pluronic L-92 | 10 | 47 | 10 |
| Poloxamer 284 | — | 21 | 47 | 21 |
| Poloxamer 288 | Pluronic F-98 | 122 | 47 | 122 |
| Poloxamer 331 | Pluronic L-101 | 7 | 54 | 7 |
| Poloxamer 333 | Pluronic P-103 | 20 | 54 | 20 |
| Poloxamer 334 | Pluronic P-104 | 31 | 54 | 31 |
| Poloxamer 335 | Pluronic P-105 | 38 | 54 | 38 |
| Poloxamer 338 | Pluronic F-108 | 128 | 54 | 128 |
| Poloxamer 401 | Pluronic L-121 | 6 | 67 | 6 |
| Poloxamer 403 | Pluronic P-123 | 21 | 67 | 21 |
| Poloxamer 407 | Pluronic F-127 | 98 | 67 | 98 |

As known in the art, the names of the poloxamers and Pluronics (as given above) contain numbers which provide information on the chemical composition. For example, the generic poloxamer name contains three digits, wherein the first two digits×100 indicates the approximate molecular weight of the PPO portion and the last digit×10 indicates the weight percent of the PEO portion. Accordingly, poloxamer 338 possesses a PPO portion of about 3300 g/mole molecular weight, and 80 wt % PEO. In the Pluronic name, the letter indicates the physical form of the product, i.e., L=liquid, P=paste, and F=solid, i.e., flake. The first digit, or two digits for a three-digit number, multiplied by 300, indicates the approximate molecular weight of the PPO portion, while the last digit×10 indicates the weight percent of the PEO portion. For example, Pluronic® F-108 (which corresponds to poloxamer 338) indicates a solid form composed of about 3,000 g/mol of the PPO portion and 80 wt % PEO.

Numerous other types of copolymers containing PEO and PPO blocks are possible, all of which are applicable herein. For example, the block copolymer can also be a reverse poloxamer of general formula:

$$(PPO)_a\text{-}(PEO)_b\text{-}(PPO)_c \qquad (2)$$

wherein all of the details considered above with respect to the regular poloxamers (e.g., description of a, b, and c subscripts, and all of the other exemplary structural possibilities) are applicable by reference herein to the reverse poloxamers.

In another variation, the block copolymer contains a linking diamine group (e.g., ethylenediamine, i.e., EDA) or triamine group (e.g., melamine). Some examples of such copolymers include the Tetronics® (e.g., PEO-PPO-EDA-PPO-PEO) and reverse Tetronics® (e.g., PPO-PEO-EDA-PEO-PPO).

In some embodiments, any one or more classes or specific types of block copolymers described above are excluded from the preparative method described herein.

The phenolic compound or material of the precursor composition can be any phenolic compound or material that can react by a condensation reaction with an aldehydic compound or material (such as formaldehyde) under acidic conditions. Typically, any compound or material containing a hydroxy group bound to an aromatic ring (typically, a phenyl ring) is suitable for the present invention as a phenolic compound or material.

In one embodiment, the phenolic compound or material contains one hydroxy group bound to a benzene ring. The benzene ring may be unsubstituted (i.e., the compound "phenol"), or the benzene ring may be substituted with one or more groups, such as one or more groups selected from hydrocarbon, halide, nitro, amino, hydroxy, and alkoxy groups. Some examples of such compounds include phenol, the halophenols, the aminophenols, the hydrocarbyl-substituted phenols (wherein "hydrocarbyl" includes, e.g., straight-chained, branched, or cyclic alkyl, alkenyl, or alkynyl groups typically containing from 1 to 6 carbon atoms, optionally substituted with one or more oxygen or nitrogen atoms), naphthols, nitrophenols, hydroxyanisoles, hydroxybenzoic acids, fatty acid ester-substituted or polyalkyleneoxy-substituted phenols (e.g., on the 2 or 4 positions with respect to the hydroxy group), phenols containing an azo linkage (e.g., p-hydroxyazobenzene), phenolsulfonic acids (e.g., p-phenolsulfonic acid), and dihydroxybiphenyls. Some general subclasses of halophenols include the fluorophenols, chlorophenols, bromophenols, and iodophenols, and their further sub-classification as, for example, p-halophenols (e.g., 4-fluorophenol, 4-chlorophenol, 4-bromophenol, and 4-iodophenol), m-halophenols (e.g., 3-fluorophenol, 3-chlorophenol, 3-bromophenol, and 3-iodophenol), o-halophenols (e.g., 2-fluorophenol, 2-chlorophenol, 2-bromophenol, and 2-iodophenol), dihalophenols (e.g., 3,5-dichlorophenol and 3,5-dibromophenol), and trihalophenols (e.g., 3,4,5-trichlorophenol, 3,4,5-tribromophenol, 3,4,5-trifluorophenol, 3,5,6-trichlorophenol, and 2,3,5-tribromophenol). Some examples of aminophenols include 2-, 3-, and 4-aminophenol, and 3,5- and 2,5-diaminophenol. Some examples of nitrophenols include 2-, 3-, and 4-nitrophenol, and 2,5- and 3,5-dinitrophenol. Some examples of hydrocarbyl-substituted phenols include the cresols, i.e., methylphenols or hydroxytoluenes (e.g., o-cresol, m-cresol, p-cresol), the xylenols (e.g., 3,5-, 2,5-, 2,3-, and 3,4-dimethylphenol), the ethylphenols (e.g., 2-, 3-, and 4-ethylphenol, and 3,5- and 2,5-diethylphenol), n-propylphenols (e.g., 4-n-propylphenol), isopropylphenols (e.g., 4-isopropylphenol), butylphenols (e.g., 4-n-butylphenol, 4-isobutylphenol, 4-t-butylphenol, 3,5-di-t-butylphenol, 2,5-di-t-butylphenol), hexylphenols, octyl phenols (e.g., 4-n-octylphenol), nonylphenols (e.g., 4-n-nonylphenol), phenylphenols (e.g., 2-phenylphenol, 3-phenylphenol, and 4-phenylphenol), and hydroxycinnamic acid (p-coumaric acid). Some examples of hydroxyanisoles include 2-methoxyphenol, 3-methoxyphenol, 4-methoxyphenol, 3-t-butyl-4-hydroxyanisole (e.g., BHA), and ferulic acid. Some examples of hydroxybenzoic acids include 2-hydroxybenzoic acid (salicylic acid), 3-hydroxybenzoic acid, 4-hydroxybenzoic acid, and their organic acid esters (e.g., methyl salicylate and ethyl-4-hydroxybenzoate).

In another embodiment, the phenolic compound or material contains two phenol groups (i.e. two hydroxy groups bound to a benzene ring, or two hydroxy groups bound to different benzene rings of the same molecule). Some examples of such compounds include catechol, resorcinol, hydroquinone, the hydrocarbyl-linked bis-phenols (e.g., bis-phenol A, methylenebisphenol, and 4,4'-dihydroxystilbene), 4,4'-dihydroxybiphenyl (i.e., 4,4'-biphenol), the halo-substituted diphenols (e.g., 2-haloresorcinols, 3-haloresorcinols, and 4-haloresorcinols, wherein the halo group can be fluoro, chloro, bromo, or iodo), the amino-substituted diphenols (e.g., 2-aminoresorcinol, 3-aminoresorcinol, and 4-aminoresorcinol), the hydrocarbyl-substituted diphenols (e.g., 2,6-dihydroxytoluene, i.e., 2-methylresorcinol; 2,3-, 2,4-, 2,5-, and 3,5-dihydroxytoluene, 1-ethyl-2,6-dihydroxybenzene, caffeic acid, and chlorogenic acid), the nitro-substituted diphenols (e.g., 2- and 4-nitroresorcinol), dihydroxyanisoles (e.g., 3,5-, 2,3-, 2,5-, and 2,6-dihydroxyanisole, and vanillin), dihydroxybenzoic acids (e.g., 3,5-, 2,3-, 2,5-, and 2,6-dihydroxybenzoic acid, and their alkyl esters, and vanillic acid), and phenolphthalein.

In another embodiment, the phenolic compound or material contains three phenol groups (i.e. three hydroxy groups bound to a benzene ring, or three hydroxy groups bound to different benzene rings of the same molecule). Some examples of such compounds include phloroglucinol (1,3,5-trihydroxybenzene), pyrogallol (1,2,3-trihydroxybenzene), 1,2,4-trihydroxybenzene, 5-chloro-1,2,4-trihydroxybenzene, resveratrol (trans-3,5,4'-trihydroxystilbene), the hydrocarbyl-substituted triphenols (e.g., 2,4,6-trihydroxytoluene, i.e., methylphloroglucinol, and 3,4,5-trihydroxytoluene), the halogen-substituted triphenols (e.g., 5-chloro-1,2,4-trihydroxybenzene), the carboxy-substituted triphenols (e.g., 3,4,5-trihydroxybenzoic acid, i.e., gallic acid or quinic acid, and 2,4,6-trihydroxybenzoic acid), the nitro-substituted triphenols (e.g., 2,4,6-trihydroxynitrobenzene), and phenol-formaldehyde resoles or novolak resins containing three phenol groups.

In yet another embodiment, the phenolic compound or material contains multiple (i.e., greater than three) phenol groups. Some examples of such compounds or materials include tannin (e.g., tannic acid), tannin derivatives (e.g., ellagotannins and gallotannins), phenol-containing polymers (e.g., poly-(4-hydroxystyrene)), phenol-formaldehyde resoles or novolak resins containing at least four phenol groups (e.g., at least 4, 5, or 6 phenol groups, and generally of 500-5000 M.W.), quercetin, ellagic acid, and tetraphenol ethane.

In some embodiments, any one or more classes or specific types of phenolic compounds or materials described above are excluded from the preparative method described herein.

The crosslinkable aldehyde component can be any organic compound or material containing an aldehyde group. In many embodiments, the crosslinkable aldehyde is formaldehyde. However, there are also numerous organoaldehydes, organodialdehydes, and polyaldehydes (e.g., organotrialdehydes, organotetraaldehydes, and so on) considered herein which can serve the same purpose. The organoaldehydes can be generally represented by the following formula:

R—CHO                                     (3)

In Formula (3), R can represent a straight-chained, branched, or cyclic hydrocarbyl group, which can be either saturated or unsaturated, typically containing at least 1, 2, or 3 carbon atoms, and up to 4, 5, 6, 7, or 8 carbon atoms. Some examples of suitable organoaldehydes include acetaldehyde, propanal (propionaldehyde), butanal (butyraldehyde), pentanal (valeraldehyde), hexanal, crotonaldehyde, acrolein, benzaldehyde, and furfural.

The organodialdehydes can be generally represented by the following formula:

OHC—R—CHO                                 (4)

wherein R is a bond (in the case of glyoxal) or a straight-chained, branched, or cyclic hydrocarbyl linking group, which can be either saturated or unsaturated, typically containing at least 1, 2, or 3 carbon atoms, and up to 4, 5, 6, 7, 8, 9, or 10 carbon atoms. Some examples of dialdehyde compounds include glyoxal (when R is a bond), malondialdehyde (when R is methylene), succinaldehyde, glutaraldehyde, adipaldehyde, pimelaldehyde, suberaldehyde, sebacaldehyde, cyclopentanedialdehyde, terephthaldehyde, and furfuraldehyde. In some embodiments, one of the aldehydic hydrogens of a dialdehyde can be replaced with a hydrocarbyl group, thereby resulting in an aldehyde-ketone dione compound, such as methylglyoxal or 1,3-butanedione.

In some embodiments, any one or more classes or specific types of aldehyde compounds or materials described above are excluded from the preparative method described herein.

The acidic component in the precursor composition can be any acid strong enough to accelerate the reaction between phenolic and dione compounds. In some embodiments, the acid is a weak acid, such as a weak organic acid (e.g., acetic acid, propionic acid, or citric acid) or a weak inorganic acid (e.g., phosphoric acid). In other embodiments, the acid is a strong acid, such as a mineral acid, such as hydrochloric acid, hydrobromic acid, hydroiodic acid, sulfuric acid, or a superacid, such as triflic acid. Depending on the type of acid and other conditions, the molar concentration of acid (per total precursor composition) can be, for example, precisely, about, at least, less than, or up to 0.1 molar (i.e., 0.1M), 0.2 M, 0.5 M, 1.0 M, 1.5 M, 2.0 M, 2.5 M, 3.0 M, 3.5 M, 4.0 M, 4.5 M, 5.0M, or an acid concentration within a range bounded by any two of the foregoing values. The molar concentration values given may also be referred to in terms of molar equivalents of $H^+$, or pH, wherein the pH for a strong acid generally abides by the formula $pH=-\log[H^+]$, wherein $[H^+]$ represents the concentration of $H^+$ ions. In some embodiments, any one or more classes or specific types of acids described above are excluded from the preparative method described herein. In a particular embodiment, a weak acid (i.e., having a pKa above $-2$), such as the weak organic acids (e.g., p-toluenesulfonic acid) or weak inorganic acids (e.g., phosphoric or hypophosphorous acid), are excluded from the precursor composition.

Any one or more of the above components or final product can be dissolved, dispersed, or otherwise in contact with a liquid, which can be a suitable solvent. The solvent can be, for example, an organic polar protic or non-protic solvent. Some examples of organic polar protic solvents include alcohols, e.g., methanol, ethanol, n-propanol, isopropanol, ethylene glycol, and the like. Some examples of organic polar non-protic solvents include acetonitrile, dimethylformamide, dimethylsulfoxide, methylene chloride, organoethers (e.g., tetrahydrofuran or diethylether), and the like. The liquid or solvent can also be an ionic liquid, such as an imidazolium or piperidinium ionic liquid. The liquid or solvent can be used in the processing of components to make the final product (and generally, eventually removed), or included with the product as a component of the final product or an intermediate thereof. In some embodiments, any one or more of the above classes or specific types of liquids can be excluded from a portion or the entire preparative process described above, or from the final product.

In some embodiments, the molar amount of crosslinkable aldehyde component is higher than the molar amount of phenolic component (i.e., molar ratio of aldehyde to phenolic components is greater than 1). In such embodiments, the molar ratio of aldehyde to phenolic components may be precisely, about, or at least, for example, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, or within a range bounded by any two of these values. In other embodiments, the molar amount of aldehyde component is less than the molar amount of phenolic component (i.e., molar ratio of aldehyde to phenolic components is less than 1). In such embodiments, the molar ratio of aldehyde to phenolic components may be precisely, about, or less than, for example, 0.9, 0.8, 0.7, 0.6, 0.5, 0.4, 0.3, or 0.2, or within a range bounded by any two of these values. In other embodiments, the molar amount of aldehyde component is about the same as the molar amount of phenolic component, i.e., a ratio of about 1.

The amount of conductive carbon nanoparticles incorporated into the composite material can be conveniently expressed as a percent by weight (wt %) of the conductive carbon nanoparticles by total weight of the carbon nanoparticles and phenolic component. Thus, if wt % of carbon nanoparticles is designated by X, the wt % of the phenolic component can be designated as 100-X. For purposes of the instant invention, the percent by weight of carbon nanoparticles by total weight of carbon nanoparticles and phenolic component should be greater than zero and less than 100%. By the foregoing definition, an amount of carbon nanoparticles of 0% corresponds to an amount of phenolic component of 100%; and an amount of carbon nanoparticles of 100% corresponds to an amount of phenolic component of 0%, none of which are included as exemplary of the instant invention, but which may be referred to in this disclosure for the purpose of comparison. In different embodiments, the amount of carbon nanoparticles can be precisely, at least, up to, or less than, for example, 1 wt %, 2 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt %, or 97 wt % by total weight of the carbon nanoparticles and phenolic component, or a wt % of carbon nanoparticles within a range bounded by any two of the foregoing exemplary values (for example, a minimum wt % of carbon nanoparticles of 5, 10, 15, 20, 25, or 30 wt % and a maximum wt % of carbon nanoparticles of 50, 60, 70, 75, 80, 85, 90, or 95 wt %).

After the precursor components (i.e., i to v) are all combined, the combined mixed components are generally subjected to a curing step to convert the mixture to a crosslinked gel or solid material. The curing step includes any of the conditions, as known in the art, that promote polymerization, and preferably, crosslinking, of polymer precursors, and in particular, crosslinking between phenolic and aldehydic components to form a solid crosslinked carbon precursor. The curing conditions generally include application of an elevated temperature for a specified period of time without significant carbonization (or any carbonization) of the precursor. Other curing conditions and methods can be used in the curing step, including radiative (e.g., UV curing) or purely chemical (i.e., without use of an elevated temperature). Preferably, the curing step involves subjecting the polymer precursors or the entire precursor composition to a temperature of about, at least, up to, or less than 60, 70, 80, 90, 100, 110, 120, 130, 140° C., 150° C., 160° C., 170° C., 180° C., 190° C., or 200° C. for a time period of, typically, at least 0.5, 1, 2, 5, 10, or 12 hours and up to 15, 20, 24, 36, 48, or 72 hours, wherein it is understood that higher temperatures generally require shorter time periods. Alternatively, the curing temperature is within a range bounded by any two of the exemplary curing temperatures recited above.

In particular embodiments, it may be preferred to subject the precursors to an initial lower temperature curing step followed by a higher temperature curing step. The initial curing step may employ a temperature of about, for example, 60, 70, 80, 90, or 100° C. (or a range between any of these), while the subsequent curing step may employ a temperature of about, for example, 90, 100, 110, 120, 130, 140° C., 150° C., 160° C., 170° C., 180° C., 190° C., or 200° C. (or a range between any of these), provided that the temperature of the initial curing step is less than the temperature of the subsequent curing step. In addition, each curing step can employ any of the exemplary time periods given above.

Alternatively, it may be preferred to gradually increase the temperature during the curing step between any of the temperatures given above, or between room temperature (e.g., 15, 20, 25, 30, or 35° C.) and any of the temperatures given above. In different embodiments, the gradual increase in temperature can be practiced by employing a temperature increase rate of, or at least, or no more than 1° C./min, 2° C./min, 3° C./min, 5° C./min, 7° C./min, 10° C./min, 12° C./min, 15° C./min, 20° C./min, or 30° C./min, or any suitable range between any of these values. The gradual temperature increase can also include one or more periods of residency at a particular temperature, and/or a change in the rate of temperature increase.

The carbonization step includes any of the conditions, as known in the art, which cause carbonization of the precursor composition, and which is no more than or less than 2000° C. In different embodiments, a carbonization temperature of about, at least, up to, or less than 300° C., 350° C., 400° C., 450° C., 500° C., 550° C., 600° C., 650° C., 700° C., 750° C., 800° C., 850° C., 900° C., 950° C., 1000° C., 1050° C., 1100° C., 1150° C., 1200° C., 1250° C., 1300° C., 1350° C., 1400° C., 1450° C., 1500° C., 1600° C., 1700° C., 1800° C., 1900° C., or 2000° C. (or a temperature within a range therein) is employed for a time period of, typically, at least 1, 2, 3, 4, 5, or 6 hours and up to 7, 8, 9, 10, 11, or 12 hours, wherein it is understood that higher temperatures generally require shorter time periods to achieve the same result. Alternatively, the carbonization temperature may be selected from a range bounded by any two exemplary carbonization temperatures recited above.

In particular embodiments, it may be preferred to subject the precursors to an initial lower temperature carbonization step followed by a higher temperature carbonization step. The initial carbonization step may employ a temperature of about, for example, 300, 350, 400, 450, 500, 550, 600, 650, 700, 750, 800, 850, or 900° C. (or a range between any of these), while the subsequent carbonization step may employ a temperature of about, for example, 500, 550, 600, 650, 700, 750, 800, 850, 900, 950, 1000, 1050, 1100, 1200, 1250, 1300, 1400, 1450, 1500, 1600, 1700, 1900° C., or 2000° C. (or a range between any of these), provided that the temperature of the initial carbonization step is less than the temperature of the subsequent carbonization step. In addition, each carbonization step can employ any of the exemplary time periods given above.

Alternatively, it may be preferred to gradually increase the temperature during the carbonization step between any of the carbonization temperatures given above, or between room temperature (e.g., 15, 20, 25, 30, or 35° C.) or any of the curing temperatures provided above and any of the carbonization temperatures given above. Thus, in some embodiments, a curing step and carbonization step may be performed continuously, one after the other, with no clear boundary between the steps. In different embodiments, the gradual increase in temperature can be practiced by employing a temperature increase rate of, or at least, or no more than 1° C./min, 2° C./min, 3° C./min, 5° C./min, 7° C./min, 10° C./min, 12° C./min, 15° C./min, 20° C./min, 30° C./min, 40° C./min, or 50° C./min, or any suitable range between any of these values. The gradual temperature increase can also include one or more periods of residency at a particular temperature, and/or a change in the rate of temperature increase.

As discussed above, the mesoporous carbon composite produced by the above method, directly after carbonization, will have an acceptably high conductivity for most applications, including as an electrically conductive electrode. Generally, for mesoporous carbon materials known in the art, the mesoporous carbon material is made conductive by graphitization at temperatures significantly higher than used for carbonization. However, by virtue of the conductive (generally, graphitic) carbon nanoparticles incorporated in the mesoporous carbon composite described herein, a high conductivity is achieved without use of a high-temperature graphitization step. Thus, a graphitization step is preferably omitted for the purposes of the instant invention, particularly since the high temperature employed in the graphitization step can have several deleterious effects, as discussed above.

As also discussed above, the mesoporous carbon matrix is generally not completely graphitic or not graphitic at all after the carbonization step. Although this generally does not adversely affect the properties of the mesoporous carbon composite, there may be a reason, under certain conditions, that a graphitization step is employed to increase the graphitic character of the mesoporous carbon matrix. Thus, if desired, the precursor composition or the carbonized material can be subjected to a graphitization step. Typically, the temperature capable of causing graphitization is a temperature of or greater than about 2000° C., 2100° C., 2200° C., 2300° C., 2400° C., 2500° C., 2600° C., 2700° C., 2800° C., 2900° C., 3000° C., 3100° C., or 3200° C., or a temperature within a range between any two of these temperatures, for a time period of or less than, for example, 10, 20, or 30 minutes, or any of the time periods provided above. Preferably, the carbonization or graphitization step is conducted in an atmosphere substantially removed of oxygen, e.g., typically under an inert atmosphere. Some examples of inert atmospheres include nitrogen and the noble gases (e.g., helium or argon). Other conditions that generally favor graphitization (e.g., inclusion of catalytic species, such as iron (III) complexes) may be included, but can also be excluded in some embodiments.

In some embodiments, after combining the components of the precursor composition, and before curing or carbonization, the solution is stirred for a sufficient period of time (e.g., at least or about 1, 2, 5, 10, 20, 30, 40, 50, 60, 90, or 120 minutes, or a range between any these values) until a phase separation or precipitation is evident. In some cases, the solution turns turbid. The turbidity generally indicates formation of an ordered nanocomposite gel or solid which has undergone a degree of phase separation from the liquid portion of the solution. If desired, stirring can be continued after the onset of turbidity, such that the total amount of stirring time before curing, carbonization, or a phase-separation process is any of the exemplary time periods given above, or a much longer period of time, such as several hours (e.g., at least or about 4, 5, 6, 7, 8, 10, or 12 hours) or days (e.g., at least or about 1, 2, 3, 4, 5, 10, 15, or 20 days), or a range between of the foregoing exemplary periods of time.

After turbidity becomes evident, the phase-separated mixture can be subjected to conditions that cause the polymerized precursor material to be isolated from the liquid portion. Any separation method can be applied herein. In a preferred embodiment, the phases are separated by centrifugation. In different embodiments, the centrifugation can be conducted at an angular speed of or at least, for example, 2000 rpm, 2500 rpm, 3000 rpm, 4000 rpm, 5000 rpm, 6000 rpm, 7000 rpm, 8000 rpm, 9000 rpm, 9500 rpm, 10000 rpm, 11000 rpm, 12000 rpm, or 15000 rpm, or a range between any of these values, for a period of time of, for example, 0.1, 0.2, 0.5, 1, 2, 3, 4, 5, 10, or 15 minutes, wherein it is understood that higher angular speeds generally require less amounts of time to effect an equivalent degree of separation. Superspeed centrifugation (e.g., up to 20,000 or 30,000 rpm) or ultracentrifugation (e.g., up to 40,000, 50,000, 60,000, or 70,000 rpm) can also be used. The gel or solid phase, once separated from the liquid phase, is preferably cured and carbonized in the substantial absence of the liquid phase according to any of the conditions described above for these processes.

In some embodiments, the pre-cured gel or viscous solid phase is cast onto a substrate, such as any of the substrates exemplified above, to make a film of the pre-cured gel or viscous solid. The precursor composition can be deposited by any suitable means known in the art to produce a film (i.e., coating) of the precursor composition on a substrate. Some examples of solution deposition processes include spin-coating, brush coating (painting), spraying, and dipping. After being deposited, the precursor film is subsequently cured and then carbonized to form the mesoporous carbon composite described above.

Alternatively, the pre-cured gel or viscous solid phase can be treated in such a manner as to form particles of the mesoporous carbon composite described above. The particles can be produced by any suitable method, such as, for example, the spray atomization techniques known in the art which also include a capability of heating at carbonization temperatures. For example, the precursor composition described above (typically, in a carrier solvent, such as THF or DMF) can be sprayed through the nozzle of an atomizer, and the particulates directed into one or more heated chambers for curing and carbonization steps. Alternatively, a portion of the precursor composition (e.g., templating agent and one of the polymer precursors, such as the phenolic) may first be atomized and the resulting particles annealed (i.e., dried) by suitable conditions; the resulting particles then exposed to the other polymer precursor (e.g., formaldehyde) and subjected to strongly acidic conditions (as described above), followed by curing and carbonization conditions. In different embodiments, the particles are at least or about, for example, 50 nm, 100 nm, 200 nm, 500 nm, 1 µm, 2 µm, 5 µm, 10 µm, 50 µm, 100 µm, 500 µm, or 1000 µm, or within a range between any two of these values.

In some embodiments, a multi-step process is employed by including one or more steps before the curing and/or carbonization steps. For example, a multi-step process may be employed wherein a film of the templating component in combination with the phenolic compound or material is first produced by, for example, applying (i.e., coating) the aforesaid mixture of components onto a surface, and casting the components as a solid film by removing solvent therefrom (e.g., by annealing). The produced film may then subsequently be reacted with the crosslinkable aldehyde component (e.g., by a vapor phase reaction with, for example, formaldehyde vapor) under acidic conditions to produce the polymerized (and optionally, crosslinked) carbon precursor material. The resulting cured film can then be carbonized to produce the mesoporous carbon composite.

The mesoporous carbon composite can also be functionalized, if desired, by methods known in the art for functionalizing carbon or graphite materials. For example, the carbon composite may be nitrogenated, fluorinated, or oxygenated by methods known in the art. The carbon material may be nitrogenated, fluorinated, or oxygenated, by, for example, exposure of the carbon film, either during or after the carbonization process, to, respectively, ammonia, fluorine gas, or oxygen under suitably reactive conditions. In the particular case of fluorination, the carbon material is typically placed in contact with fluorine gas for a period of several minutes (e.g., 10 minutes) up to several days at a temperature within 20° C. to 500° C., wherein the time and temperature, among other factors, are selected based on the degree of fluorination desired. For example, a reaction time of about 5 hours at ambient temperature (e.g., 15-30° C.) typically results in fluorination of about 10% of the total carbon; in comparison, fluorination conducted at about 500° C. for two days results in about 100% fluorination of the total carbon. In particular embodiments, the degree of nitrogenation, fluorination, or oxygenation can be about or at least 1%, 2%, 5%, 10%, 20%, 30%, 40%, 50%, 60%, 70%, 80%, 90%, 95%, or 100%, or a range between any two of these values. Alternatively, before the conductive carbon nanoparticles are mixed with the matrix precursor, the conductive carbon nanoparticles are functionalized by any of the above methods, or with a molecular or polymeric coating.

The mesoporous carbon composite can also be impregnated with one or more species that become incorporated into or bind with any part of the mesoporous carbon composite, which may be the mesoporous carbon matrix, the conductive carbon nanoparticles, or both. For example, particularly for the purpose of applying the mesoporous carbon composite as an cathode in a lithium ion battery, lithium may be incorporated, generally in the form of a lithium salt, such as $LiPF_6$ or $LiClO_4$. The anode is typically lithium (e.g., lithium foil). If the mesoporous carbon composite is being applied as a catalyst, one or more catalytic metals, such as Fe, Co, Ni, Pd, Pt, Au, may be incorporated. An electrolyte, such as ethylene carbonate or dimethoxyl carbonate, may also be incorporated into the mesoporous carbon composite.

The mesoporous carbon composite produced according to the methods described above preferably possesses a significant degree of physical resilience and robustness, such as a high thermal stability and resistance to cracking. An improved thermal stability is preferably evidenced by a substantial absence of structural shrinkage, and/or a substantial preservation of mesoporosity, and/or a substantial preservation of the BET surface area after being heat-treated at a temperature of at least 1800° C. In more preferred embodiments, the improved thermal stability is evidenced after heat treating the mesoporous carbon material at a temperature of at least 1850° C., 1900° C., 1950° C., 2000° C., 2050° C., 2100° C., 2150° C., 2200° C., 2250° C., 2300° C., 2350° C., 2400° C., 2450° C., 2500° C., 2550° C., 2600° C., 2650° C., or 2700° C., or a range between any two of the foregoing values. A "substantial absence of structural shrinkage" and a "substantial preservation of BET surface area" as used herein generally means that either of these parameters change by no more than about 5%, and more preferably, no more than about 1%, 0.5%, or 0.1% after heat treatment as compared to the original value before heat treatment. A "substantial preservation of mesoporosity" as used herein generally means that the pore volume due to micropores or macropores does not increase by more than about 5%, and more preferably, no more than about 1%, 0.5%, or 0.1%, as compared to the total pore volume.

FIG. 1 shows the proposed self-assembly mechanism of CO-x and CB-x nanocomposites at different ratios of carbon nanoparticles to phenolic component. When using an excess of resorcinol-formaldehyde, as shown in Flow A, the CO and CB nanoparticles are dispersed throughout the OMC matrix. When CO or CB nanoparticles are used in excess, as shown in Flows B and C, respectively, nanoparticles assemble differently with the resorcinol-formaldehyde resin. For small CO particles, a non-porous thin carbon film acts as a mortar and the mesopores are formed by the irregular assembly of CO. For much larger and less regular CB particles, a thin mesoporous carbon film acts as the mortar for the CB bricks. In the latter case, much larger pores are formed between aggregates of mesoporous carbon-coated CB particles.

In another aspect, the invention is directed to an electrode-containing device that includes the mesoporous carbon composite, described hereinabove, on or in at least one of the electrodes of the device. For example, a capacitive deionization (CDI) device can include the mesoporous carbon composite in one or two electrodes of the CDI device. The invention is also directed to a method for desalinating water by electrically operating the CDI device. The invention is also directed to a method of energy storage by using the mesoporous carbon composite in a battery (particularly the cathode of a lithium ion battery), capacitor, supercapacitor, or electric double layer capacitor (EDLC).

In one embodiment, at least one (or both, a portion, or all) of the electrodes of a CDI, EDLC, or lithium battery is constructed of the mesoporous carbon composite, except perhaps for the current collector. In another embodiment, the mesoporous carbon composite is in the form of a coating on a suitable base electrode material (or current collector). The base electrode material or current collector is often a conductive carbon material, such as graphite or carbon paper. In yet another embodiment, the mesoporous carbon composite is in the form of a layer covered by a layer of another porous material, such as a mesoporous carbon material, carbon foam, or porous graphite. In some embodiments, a titanium sheet current collector is used. In other embodiments, a composite material (e.g., activated carbon powder and a thermoplastic material, such as PTFE) is used as the base electrode or current collector.

In some embodiments, the mesoporous carbon composite described herein, without admixture with another carbon material, is used as the electrode or coated on a base electrode or current collector. In other embodiments, the mesoporous carbon composite described herein is admixed with one or more other carbon materials (e.g., activated carbon, another mesoporous carbon, a carbon foam, or a carbon aerogel). When admixing is desired, the porous carbon material is typically in a particulate form, such as a powder. The mesoporous carbon composite may also be admixed with a polymer, such as PVDF, or a conductive polymer.

A CDI device generally includes at least the feature of two porous electrodes of opposite polarity spaced in such a manner that flowing liquid (typically water, or an aqueous solution containing water) makes contact with the electrodes. In some embodiments, the electrodes are separated by an insulating material that permits the flow therethrough of water to be deionized by inclusion of flow channels in the insulating material. The insulating material includes means (e.g., spaces, channels, or pores) that permit the liquid to make efficient contact with the porous electrodes. When operated (i.e., by applying a suitable voltage bias across the electrodes), the CDI device removes salt species from the water by absorbing cationic species into the negatively charged electrode and anionic species into the positively charged electrode, similar to a capacitor, such as a supercapacitor or EDLC, both of which are additional applications for the mesoporous carbon composite described herein. The base electrode material can be any suitable electrically conductive material, including any of the substrate materials described above, provided the substrate material permits the CDI device to desalinate water. In particular embodiments, the base electrode material is porous.

The CDI device can have any of the features and designs known in the art. Reference is made, for example, to U.S. Pat. No. 5,636,437, U.S. Pat. No. 5,776,633, U.S. Pat. No. 5,932,185, U.S. Pat. No. 5,954,937, U.S. Pat. No. 6,214,204, U.S. Pat. No. 6,309,532, U.S. Pat. No. 6,778,378, U.S. Pat. No. 7,766,981, U.S. Pat. No. 7,835,137, U.S. Application Pub. No. 2008/0274407, U.S. Application Pub. No. 2009/0141422, U.S. Application Pub. No. 2009/0305138, U.S. Application Pub. No. 2009/0320253, H.-H. Jung, et al., *Desalination*, 216, pp. 377-385 (2007), R. W. Pekala, et al., *Journal of Non-Crystalline Solids*, 225, pp. 74-80 (1998), and D. Carriazo, et al., *J. Mater. Chem.*, 20, pp. 773-780 (2010), all of which describe numerous features and designs in CDI, EDLC, and related devices, as well as numerous methods for fabricating electrodes in such devices, as well as methods of operating CDI, EDLC and related devices. The variations and designs of CDI devices, as well as methods of manufacture, and methods of their use, described in the foregoing references, are herein incorporated by reference in their entirety. In some embodiments, one or more features described in said references are excluded from the instant CDI device. Furthermore, in some embodiments, two electrodes are employed, while in other embodiments, more than two, or a multiplicity of electrodes (for example, miniaturized electrodes) are employed. In some embodiments, the electrodes are in a stacked arrangement, such as an alternating left-right arrangement to maximize flow rate. In particular embodiments, the CDI device is a membrane capacitive deionization (MCDI) device by employing an anion-exchange membrane coated on the anode and/or a cation-exchange membrane coated on the cathode, wherein the anion- or cation-exchange membrane is generally positioned between the flowing water and respective electrode. In other embodiments, such exchange membranes are excluded from the device.

In other aspects, the mesoporous carbon composite described herein are used as chromatography media, particularly for use in HPLC, and more particularly, for use in electrochemically modulated liquid chromatography (EMLC), as described, for example, in U.S. Pat. No. 7,449,165, the contents of which are incorporated herein by reference in their entirety.

Examples have been set forth below for the purpose of illustration and to describe certain specific embodiments of the invention. However, the scope of this invention is not to be in any way limited by the examples set forth herein.

EXAMPLES

Preparation and Analysis of Mesoporous Carbon Composites

Preparation of Mesoporous Carbon Composites

Carbon onions (CO) were obtained by vacuum annealing of detonation nanodiamonds (DND) at 1500° C. yielding 4-6 nm large carbon onions, as described in Portet, C., et al., Electrochemical performance of carbon onions, nanodiamonds, carbon black and multiwalled nanotubes in electrical double layer capacitors, *Carbon*, 45, 2511-2518 (2007), the disclosure of which is herein incorporated by reference. Mesoporous carbon samples were prepared by the self-assembly of resorcinol (Sigma-Aldrich, 99%) and formaldehyde (Sigma-Aldrich, 37 wt %) in the presence of triblock copolymer Pluronic F127 (E0106-P070-E0106, BASF) purchased from Sigma-Aldrich, according to a previously reported recipe described in Wang, X. Q., et al., Facile synthesis of ordered mesoporous carbons with high thermal stability by self-assembly of resorcinol-formaldehyde and block copolymers under highly acidic conditions, *Langmuir*, 24, 7500-7505 (2008), the disclosure of which is herein incorporated by reference.

In a typical synthesis, approximately 1.1 g of resorcinol and 1.1 g of Pluronic F127 were dissolved in 4.5 mL of ethanol, 3.4 mL of water and 1.1 mL of concentrated HCl. To this, 1.3 mL of formaldehyde solution was added and the system stirred until phase separation was observed. The carbon black (CB, Sigma Aldrich, acetylene, <200 nm) and carbon onion (CO) composites were prepared by substituting the resorcinol by weight %, (5-95 wt %) and the amount of formaldehyde adjusted proportionally to the amount of resorcinol used. After stirring for additional 30 minutes, the suspensions were centrifuged at 9500 rpm for 5 minutes and the aqueous phases discarded. The isolated polymer-rich phases were quickly re-dispersed using minimal amounts of ethanol with strong stirring followed by casting on Petri dishes. Thin films were cured at room temperature for 6 hours (as well as reference resorcinol/formaldehyde-F127 film overnight) and at 150° C. for 24 hours. The phenolic resin-triblock copolymer nanocomposites were finally carbonized at 400° C. for 2 hours (1° C./min heating rate) and 850° C. for 2 hours in flowing nitrogen and using 2° C./min as the heating rate.

Ordered mesoporous carbon (OMC) reference material (i.e., without carbon nanoparticles) is herein identified as OMC-R. Composites are herein identified as CB-x and CO-x, respectively, where x stands for the weight % of CB or CO replacing resorcinol in the synthesis gels (5, 10, 25, 50 and 75 wt % of conductive carbon nanoparticles were studied in this series of experiments). A sample containing 50 wt % of CB was prepared in a similar way but without F127 template, and after carbonization the latter is identified as CB-50R. Pure carbon blacks and carbon onions are herein identified as CB—R and CO—R, respectively.

Analytical Methods

Nitrogen adsorption isotherms were measured at −196° C. using TriStar 3000 volumetric adsorption analyzer manufactured by Micromeritics Instrument Corp. (Norcross, Ga.). Before adsorption measurements, the finely ground carbon powders were degassed in flowing nitrogen from one to two hours at 200° C.

The specific surface area of the samples was calculated using the Brunauer-Emmett-Teller (BET) method within the relative pressure range of 0.05 to 0.20, as described in Kruk, M. et al., *Chem. Mater.*, 13, 3169-3183 (2001).

Pore size distributions were calculated using the BJH algorithm for cylindrical pores according to the KJS method calibrated for pores up to 10 nm, as described in Jaroniec, M. et al., Langmuir, 22, 6757-6760 (2006) and Choma, J., et al., Mesoporous carbons synthesized by soft-templating method: Determination of pore size distribution from argon and nitrogen adsorption isotherms, *Microporous and Mesoporous Materials*, 112, 573-579 (2008).

For TEM characterization, carbon powders were dispersed in ethanol using ultrasonic bath. The final suspensions were transferred to lacy carbon-coated 200-mesh copper TEM grids and dried in ambient air prior to electron microscopy analysis. Specimens were then characterized using a Hitachi HD-2000 operating in STEM mode using a secondary electron (SE) and/or bright-field STEM detector operating at 200 kV.

Raman spectra were collected using a Renishaw system 1000 Raman spectrometer equipped with an integral microscope (Leica DMLMS/N). Excitation was provided by a 25-mW He—Ne laser (Renishaw) and the 632.8 nm excitation beam was focused onto the sample with a 50× objective; the laser power at the sample was approximately 0.2-0.5 mW for carbon onions and carbon black, and 2 mW for nanocomposites. An edge filter removed the Rayleigh scattered light, while a holographic grating (1800 grooves/mm) permitted a spectral resolution of ~1 $cm^{-1}$. A silicon wafer with a Raman band at 520 $cm^{-1}$ was used to calibrate the spectrometer and the accuracy of the spectral measurements was estimated to be better than 1 $cm^{-1}$.

For the capacitive energy storage measurements, a slurry of the carbon and polyvinylidene fluoride (PVDF; 15 wt %) in N-methylpyrrolidone (NMP) was cast onto aluminum foil and dried under a heat lamp. Electrodes (13 mm diameter) were then cut out and the electrodes dried at 120° C. under vacuum. The dry electrodes were then transferred to an inert atmosphere (Argon) glove box for construction of coin-type cells.

Charge-discharge cycling of the coin-type cells was performed with varying currents (1, 2, 5, 10, 25, 50, 100 mA) on a Maccor Series 4000 instrument from zero to 2 volts with a 5 minute rest between charge and discharge cycles. The electrolyte was triethylmethylammonium tetrafluoroborate in acetonitrile (1.8 mol·$L^{-1}$). Capacitance was calculated from the discharge curve following the formula:

$$C = 2I\Delta t_d / m\Delta V$$

where I is the current, $\Delta t_d$ is the discharge time, m is the mass of carbon, and $\Delta V$ is the voltage range. Impedance spectroscopy measurements were collected using the aforementioned coin cells on a Gamry Reference 600 potentiostat in the frequency range of 0.1-$10^6$ Hz.

Results

Figure 2A:
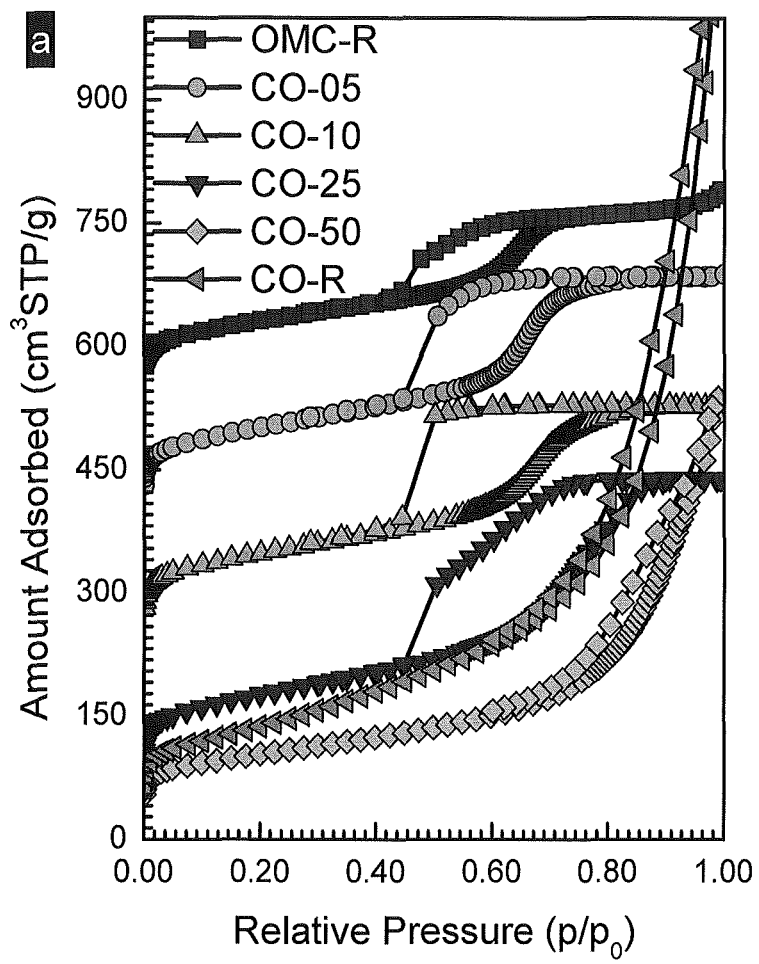
FIGS. 2a-2d. Nitrogen adsorption isotherms at −196° C. for CO-x (FIG. 2a) and CB-x (FIG. 2b) and their corresponding pore size distributions, FIGS. 2c and 2d, respectively. Adsorption isotherms were vertically offset by increments of 150 $cm^3$STP/g.
Figure 2B:
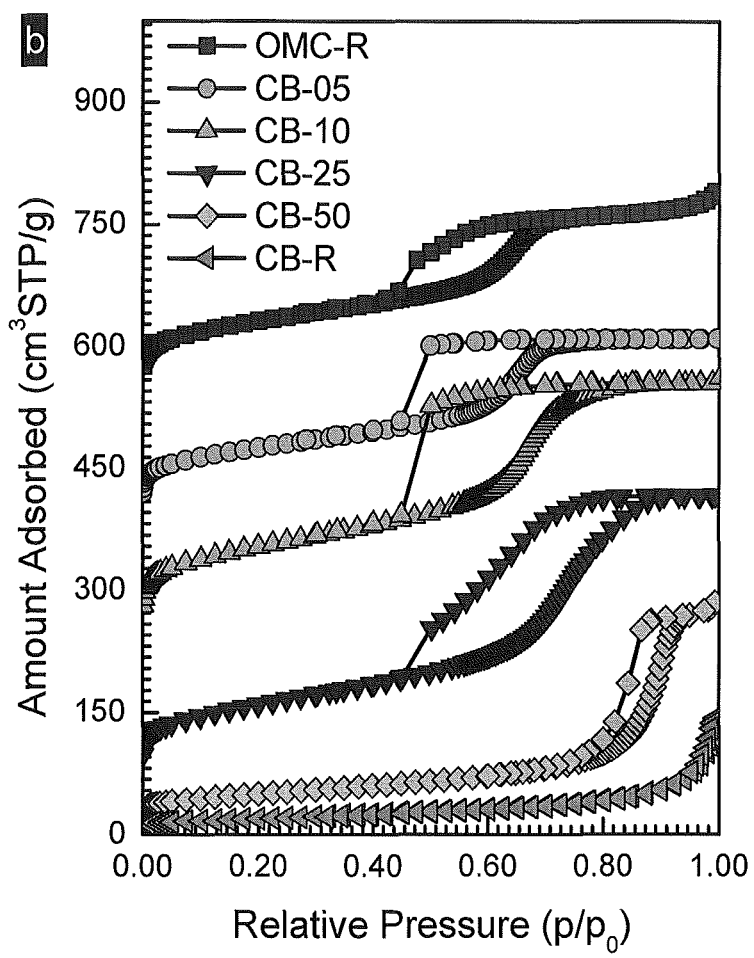
Figure 2C:
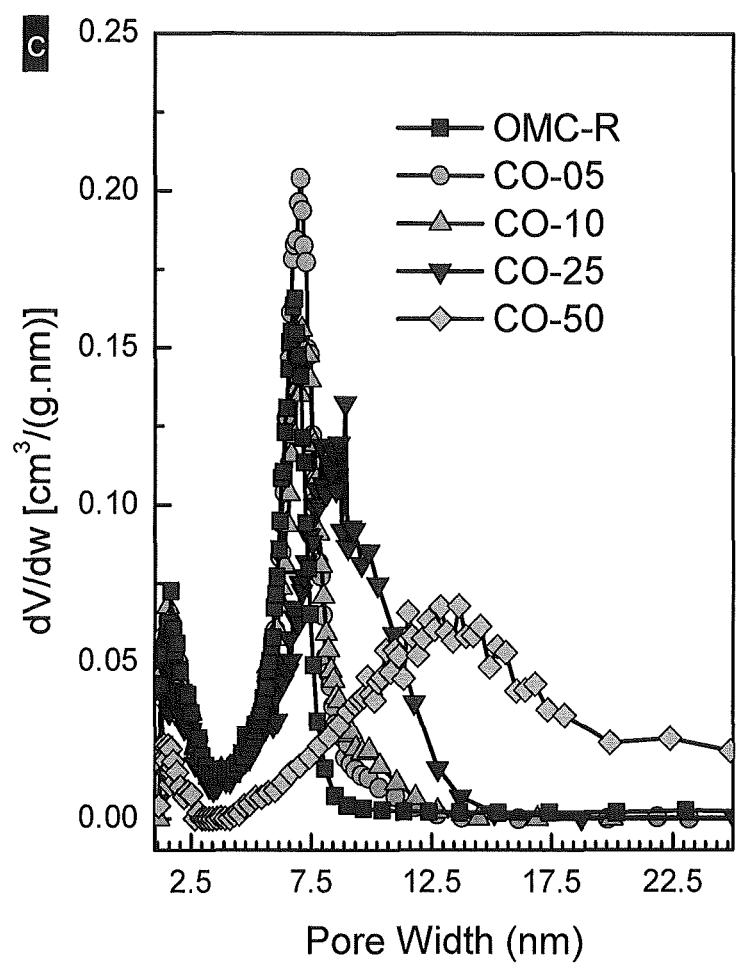
Figure 2D:
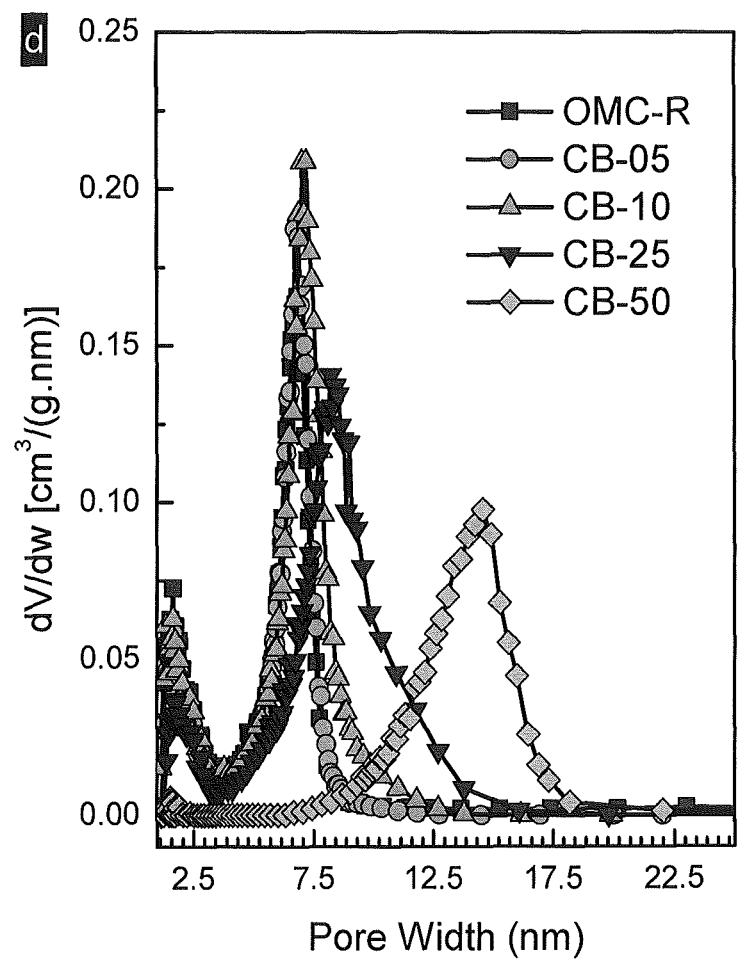
Figure 3A:
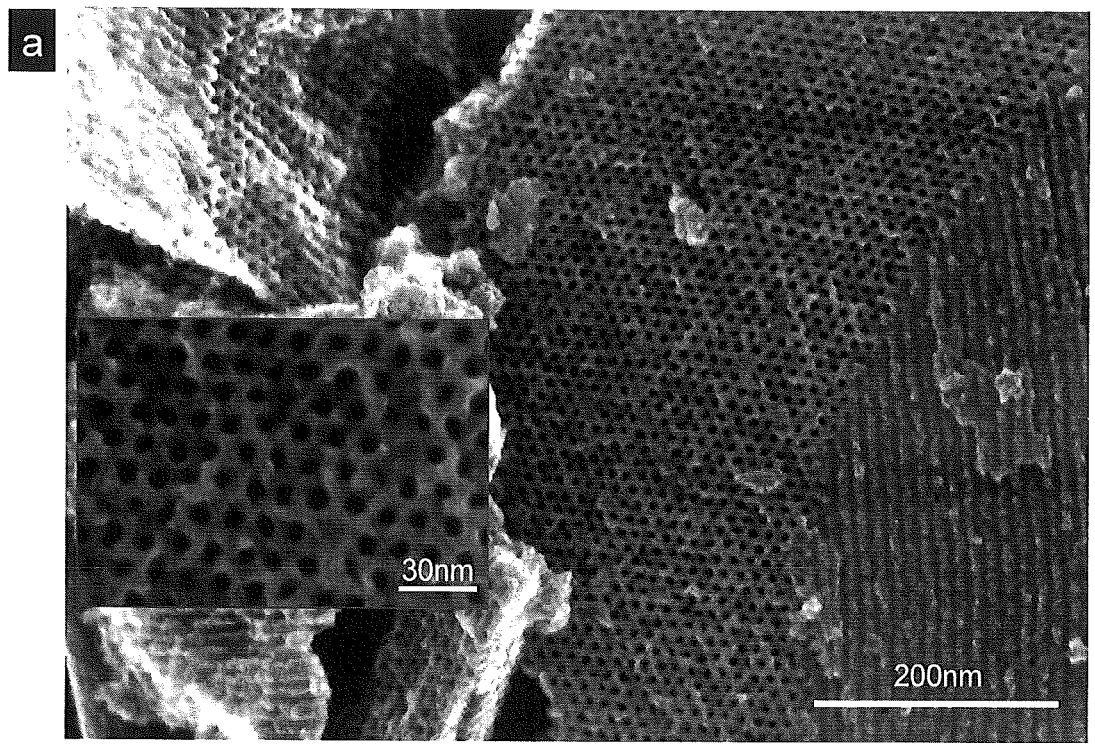
FIGS. 3a-3f. Representative SEM images for carbon onion nanocomposites CO-x, where x=5, 10 and 15 wt %, FIGS. 3a-3c, respectively. Representative TEM image for CB-5 material (FIG. 3d), and SEM images for CB-10 material (FIG. 3e), and CB-25 material (FIG. 3f).
Figure 3B:
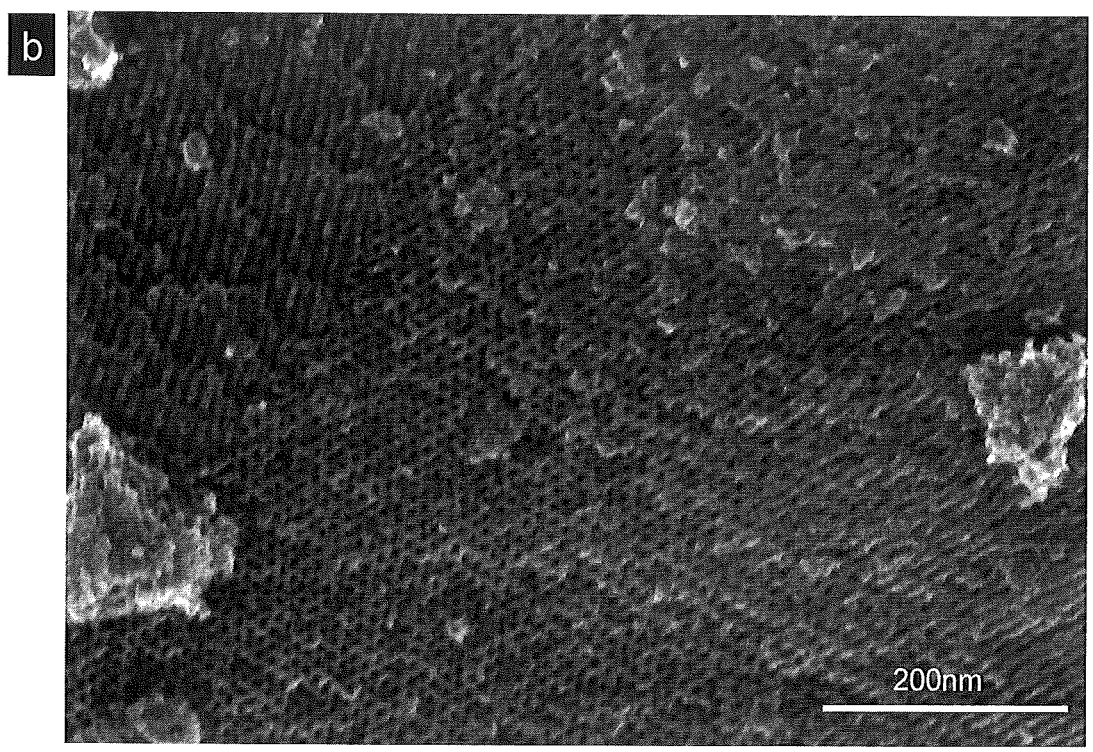
Figure 3C:
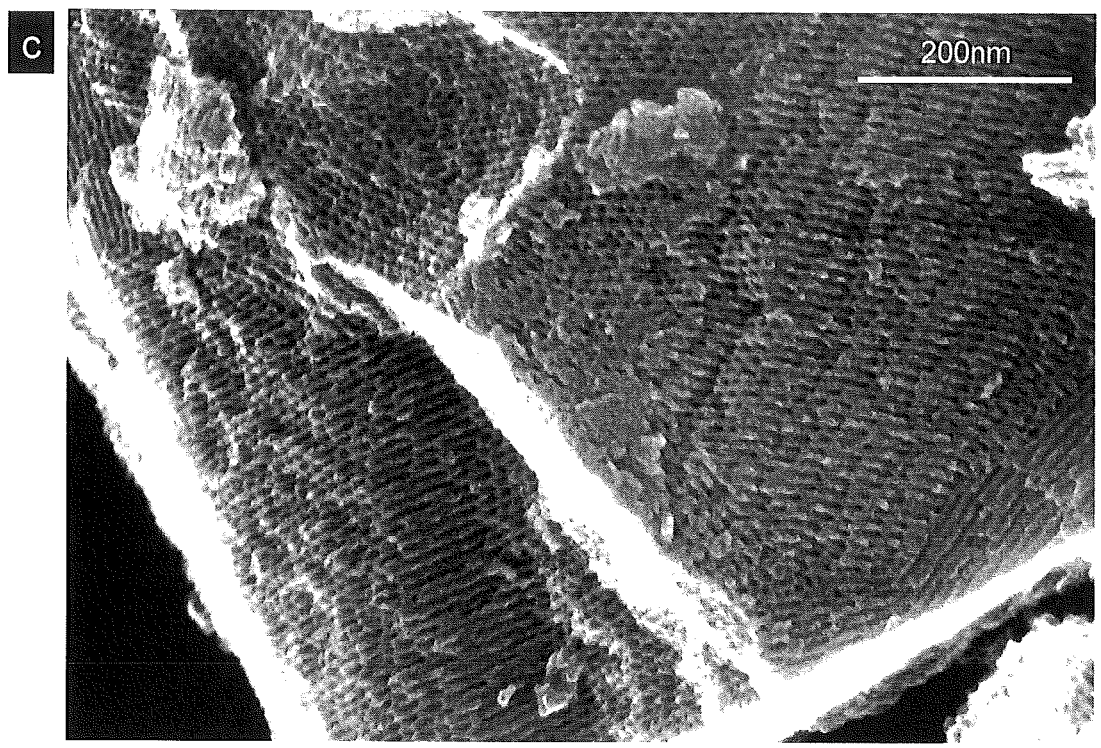
Figure 3D:
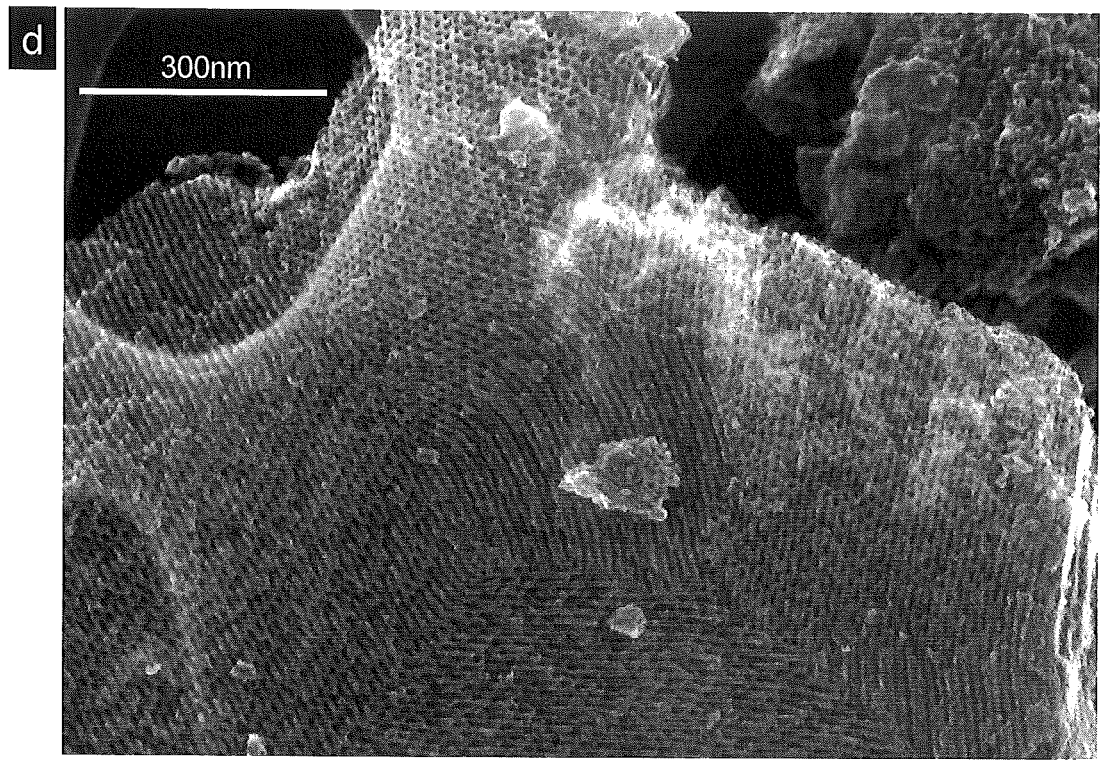
Figure 3E:
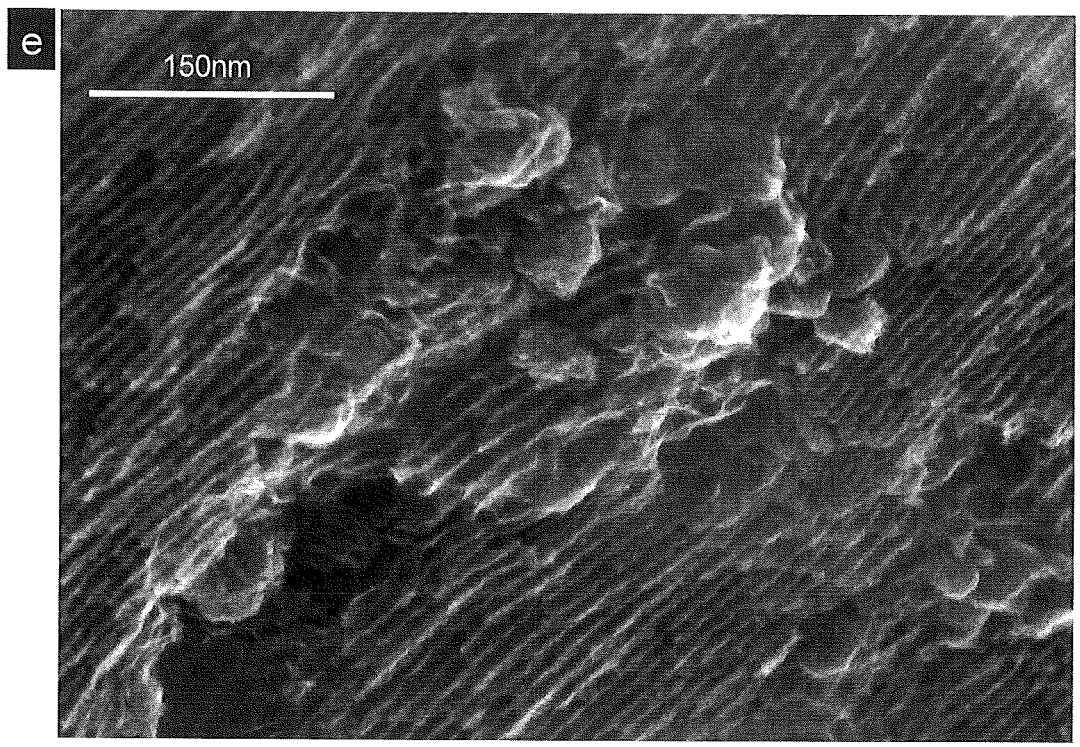
Figure 3F:
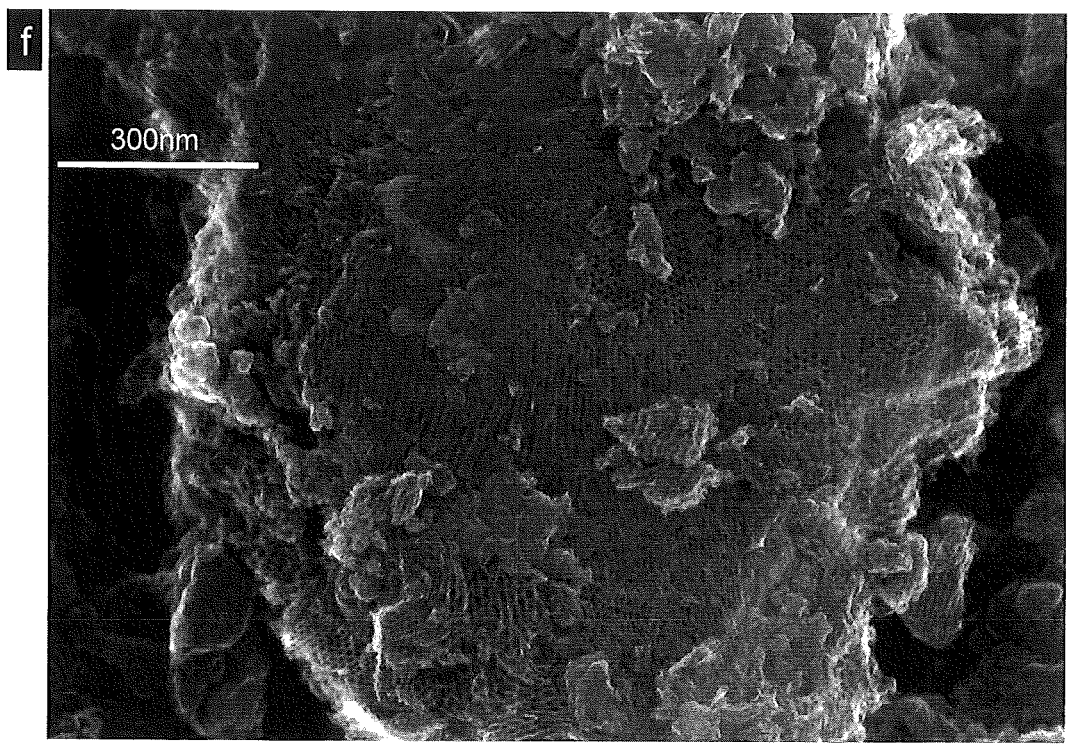

FIGS. 2a and 2b show nitrogen adsorption isotherms at −196° C. for CO-x (FIG. 2a) and CB-x (FIG. 2b). Their corresponding pore size distributions are shown in FIGS. 2c and 2d, respectively. The pore size distributions were calculated according to the improved KJS method (Jaroniec et al., 2006, Ibid.) using statistical film thickness for nonporous carbon reference (Choma et al., 2008, Ibid.). Adsorption isotherms were vertically offset by increments of 150 $cm^3$STP/g.

Nitrogen adsorption isotherms at −196° C. for CO and CB composites are characteristic of materials with large mesopores (type IV). In both series, hysteresis loops typical for large mesopores (H-1) are observed for samples containing up to 25 wt % of CO and up to 50 wt % CB in the initial gels. The calculated pore size distributions shown in FIGS. 2c and 2d clearly show that, with increased CO or CB contents, the PSD changes from a narrow distribution at around 7 nm to larger and broader distributed pores. Compared to CO with the same concentration, CB additions to OMC results in narrower PSDs while the average pore size is comparable up to 50 wt % particle concentration. Also, the total pore volumes (single point pore volume) increase proportionally to these CO and CB contents, whereas the highest surface areas were obtained for the smallest loadings of COs and CBs, i.e., 5 and 10 wt %.

The calculated adsorption parameters are summarized in Table 2 below. Samples with a high content of carbon onions (CO-50 and CO-75) show an adsorption isotherm similar to the as-received CO material. This indicates that the porosity is governed by agglomerated carbon onions and a loss of the textural templated cylindrical pores results. This is corroborated by the electron microphotographs in FIG. 3, and can, to a lesser degree, also be observed for high concentrations of carbon black. The large pore volume of CO—R is the result of the voids formed by the aggregates of onions that are very small in size, approximately 6 nm, with these textural mesopores being larger than 12 nm in diameter.

TABLE 2

Adsorption Parameters Calculated From $N_2$ Adsorption at $-196°$ C. Isotherms.[†]

| Sample | Add. Cont. (wt %) [a] | $V_{SP}$ (cm³/g) [b] | $V_{mi}$ (cm³/g) [c] | $S_{mi}$ (m²/g) [d] | $S_{BET}$ (m²/g) [e] | $W_{KJS}$ (nm) [f] |
|---|---|---|---|---|---|---|
| CB-R | 100 | 0.16 | 0.00 | 0.00 | 67 | 30.8 |
| CO-R | 100 | 1.59 | 0.00 | 0.00 | 484 | 15.1 |
| OMC-R | 0 | 0.52 | 0.17 | 252 | 629 | 6.8 |
| CO-05 | 5 | 0.60 | 0.19 | 295 | 700 | 7.0 |
| CO-10 | 10 | 0.58 | 0.18 | 285 | 688 | 7.1 |
| CO-25 | 25 | 0.68 | 0.13 | 324 | 613 | 8.9 |
| CO-50 | 50 | 0.78 | 0.05 | 243 | 363 | 13.6 |
| CO-75 | 75 | 1.14 | 0.02 | 360 | 402 | 13.7 |
| CB-05 | 5 | 0.48 | 0.17 | 234 | 608 | 6.7 |
| CB-10 | 10 | 0.62 | 0.18 | 312 | 696 | 7.0 |
| CB-25 | 25 | 0.64 | 0.12 | 300 | 556 | 8.2 |
| CB-50 | 50 | 0.43 | 0.02 | 121 | 175 | 14.6 |
| CB-75 | 75 | 0.15 | 0.01 | 50 | 66 | 29.3 |
| CB-50R | 50 | 0.12 | 0.03 | 37 | 103 | 30.3 |

[†][a]—additive content in the starting synthesis gels prior to thermal treatments; [b]—single point pore volume from adsorption isotherms at $p/p_0$ ~0.98; [c] and [d]—micropore volume and micropore surface area calculated in the $\alpha_S$-plot range of 0.75-1.00 of standard adsorption ($\alpha_S$); [e]—specific surface area calculated using the BET equation in the relative pressure range of 0.05-0.20; [f]—pore width calculated according to the improved KJS method, (Jaroniec et al., 2006, Ibid.) and statistical film thickness for nonporous carbon reference, (Choma et al., 2008, Ibid.).

To elucidate the role of triblock copolymer in the synthesis of CB composite materials, a sample was prepared by polymerization of resorcinol-formaldehyde with CB, without the triblockcopolymer, and the final material was found to be non-porous (results not shown). The pore size enlargement with increased contents of CO and CB in the synthesis gel can possibly be explained by the inability of the PEO chains of the triblock copolymer to interpenetrate the carbon particles, as compared with the pure phenolic resin. Particles with radii of gyration similar or larger than that of F127 micelles will change the conformation of the block chains, segregating larger particles in a central core, thus increasing the effective micelles size.

The structures of the mesopores of CO-x and CB-x materials were investigated by STEM, and the results shown in FIGS. 3a-3f. The images show that CO and CB particles are well dispersed in the highly ordered mesoporous carbon matrices. All CO-x and CB-x samples up to 25 wt % exhibit a 2-dimensional (2D) hexagonal arrangement of cylindrical mesopores (in particular, P6 mm symmetry). The CO-50 sample (not shown) is composed of CO walls interconnected by carbon derived from the resorcinol-formaldehyde resin. Differences were found when large CB particles were present in the gels, and a thin film of mesoporous carbon acts as the mortar for the CB bricks.

Figure 4A:
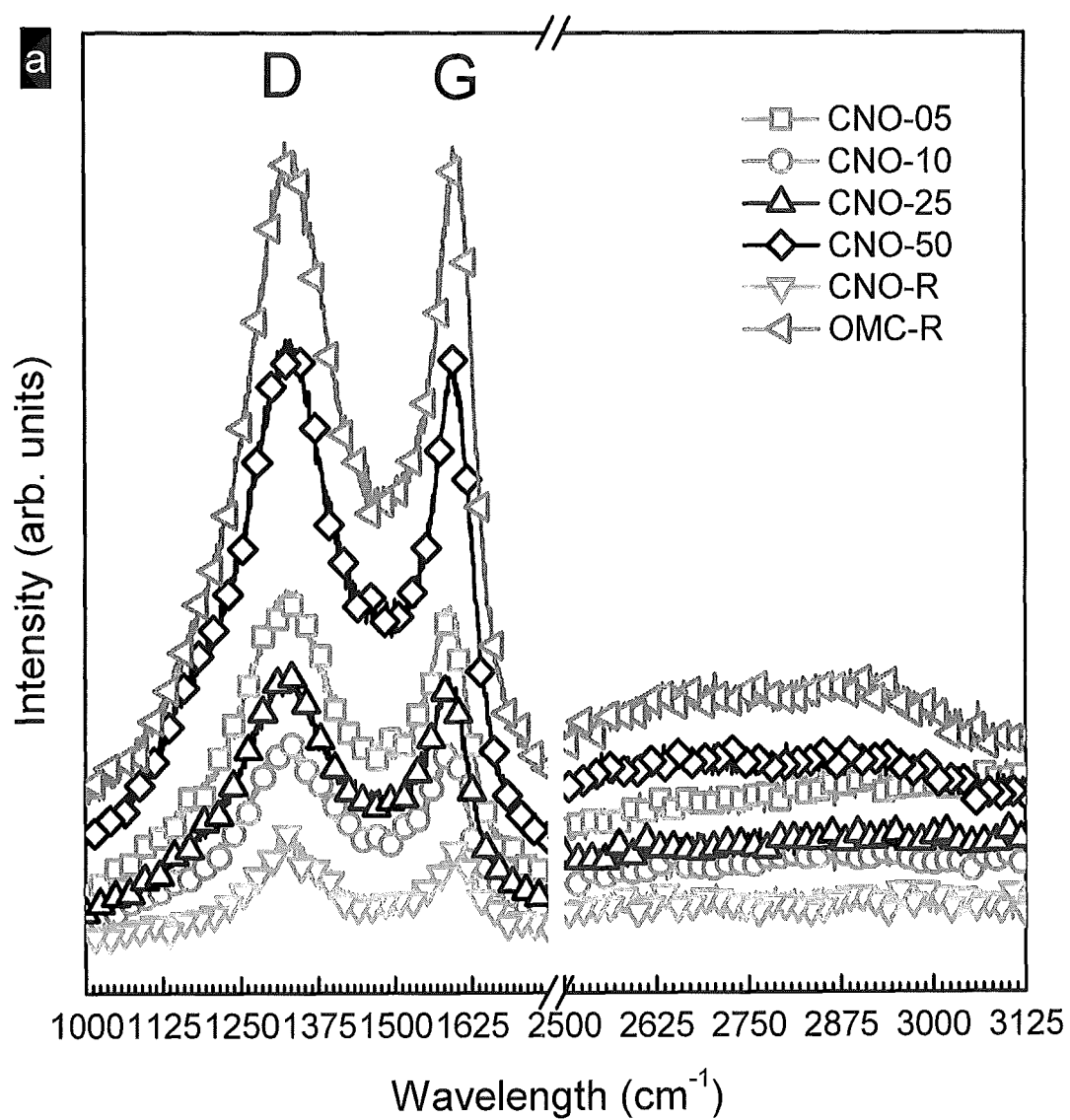
FIGS. 4a-4b. Raman spectra for selected reference materials (OMC-R, CB—R, CO—R), in comparison to CO-x (a) and CB-x (b) nanocomposites, showing the characteristic D and G bands for carbon materials, with additional intense 2D and D+G bands for the starting carbon black sample.
Figure 4B:
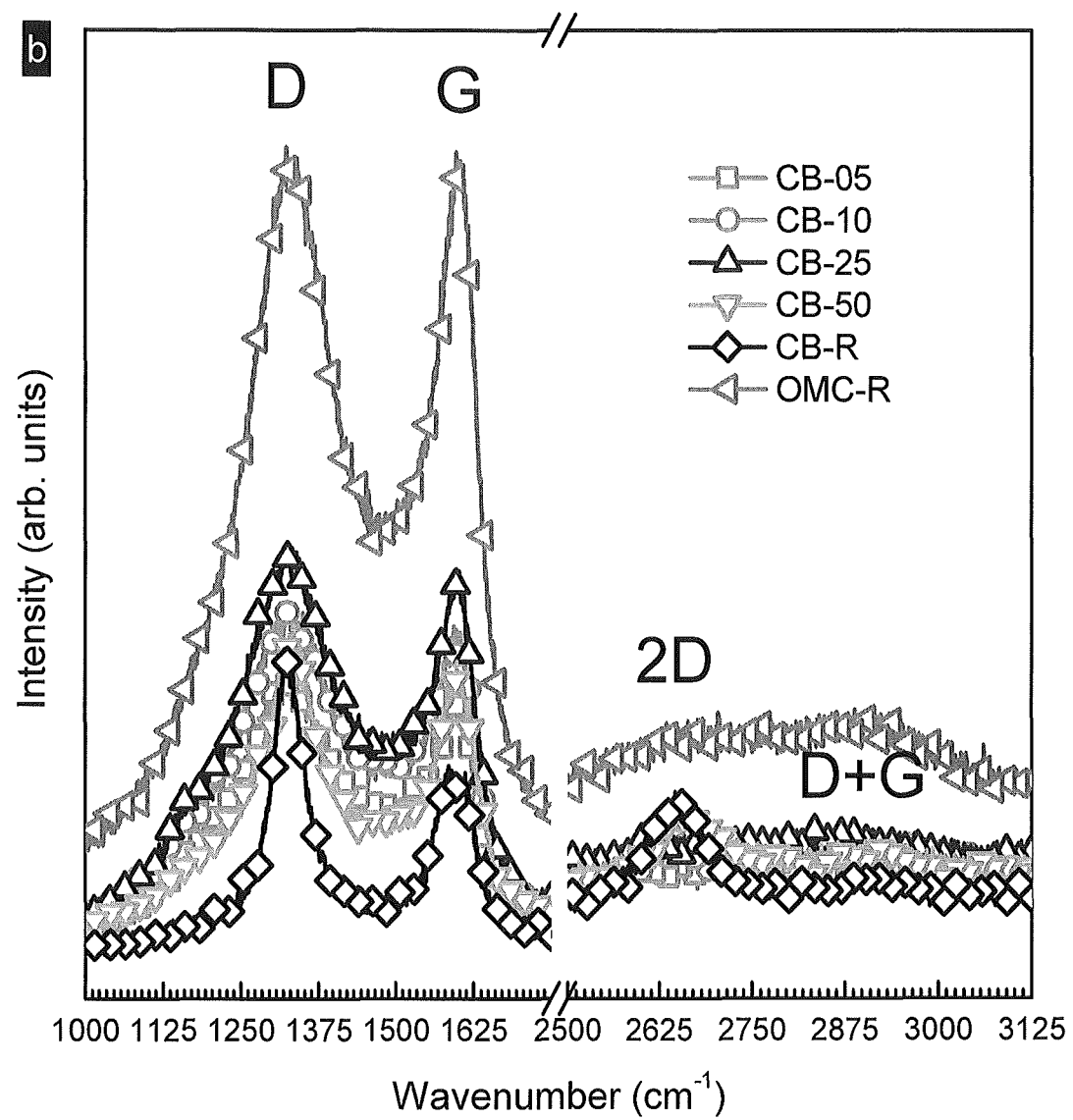

While Raman spectra of CO-x samples are indistinguishable (FIG. 4a), FIG. 4b shows that the spectrum for CB-50 sample largely resembles that of pure CB powder. CB exhibits narrower D ($-1320$ cm$^{-1}$) and G ($1590$ cm$^{-1}$) bands, relatively intense 2D ($-2650$ cm$^{-1}$) and the additional D+G band at approximately 2890-2900 cm$^{-1}$.

Figure 5A:
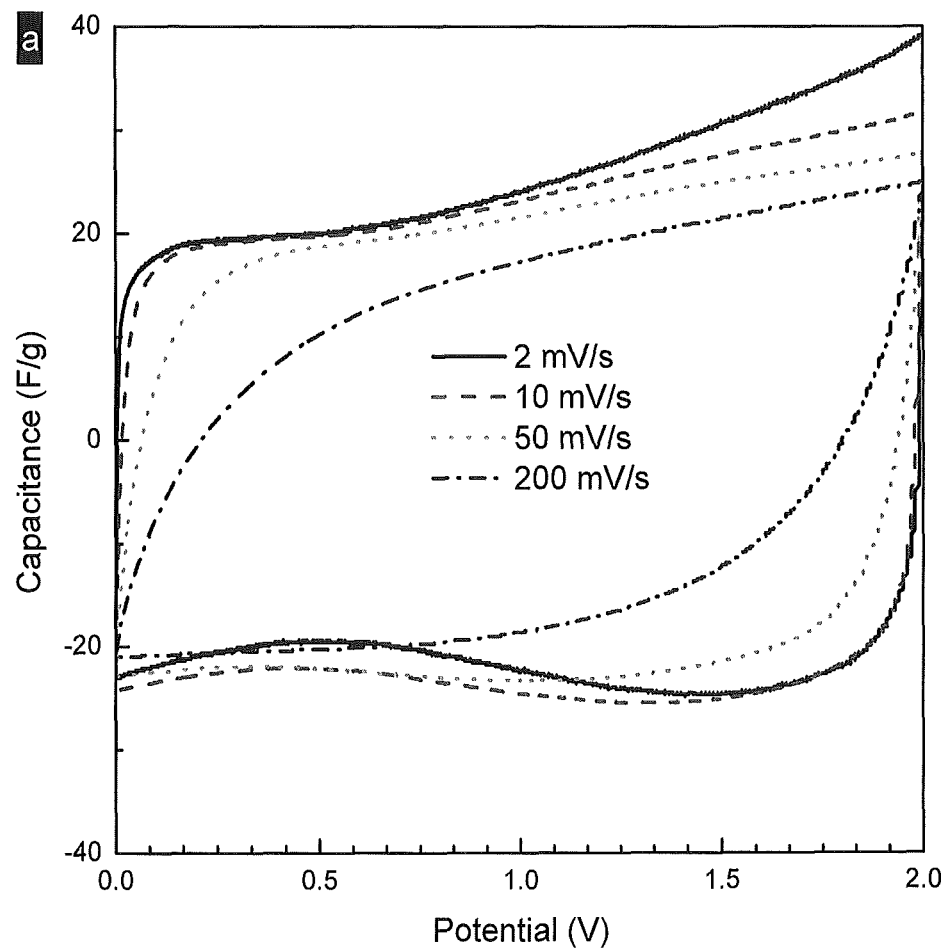
FIGS. 5a-5h. Representative cyclic voltamograms for CO-25 nanocomposite (FIG. 5a) and capacitance results as a function of the sweep rates for CO-5 in comparison to CO-25 (FIG. 5b). Nyquist plots (FIG. 5c) and magnification of semicircles in the same Nyquist curves (FIGS. 5d and 5e), both for selected CO-x and CB-x samples in comparison to CO—R and CB—R, respectively. Lower resistivity is found for higher onion and carbon black contents (f), CO composite electrodes have a better capacitive behavior (g) as the real capacitance, $C_{Real}$, represents the actual capacitance of the cell. From the maxima in the imaginary component of the capacitance, $C_{Imag}$, vs frequency, $\omega$, plots (h), the calculated time constants, $\omega$, for CO—R, CB—R, onion-based composites are higher than mesoporous carbon black composites (f); similar correlation was obtained for the time constants calculated using frequencies at −45° phase angles.
Figure 5B:
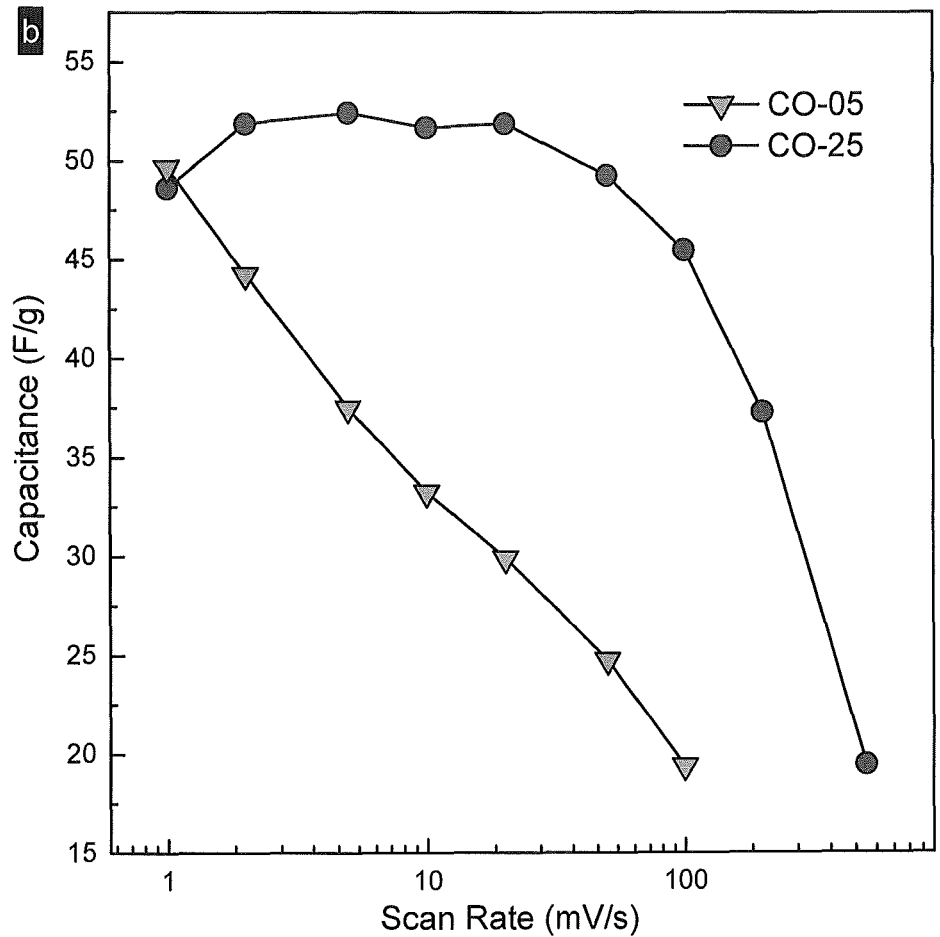
Figure 5C:
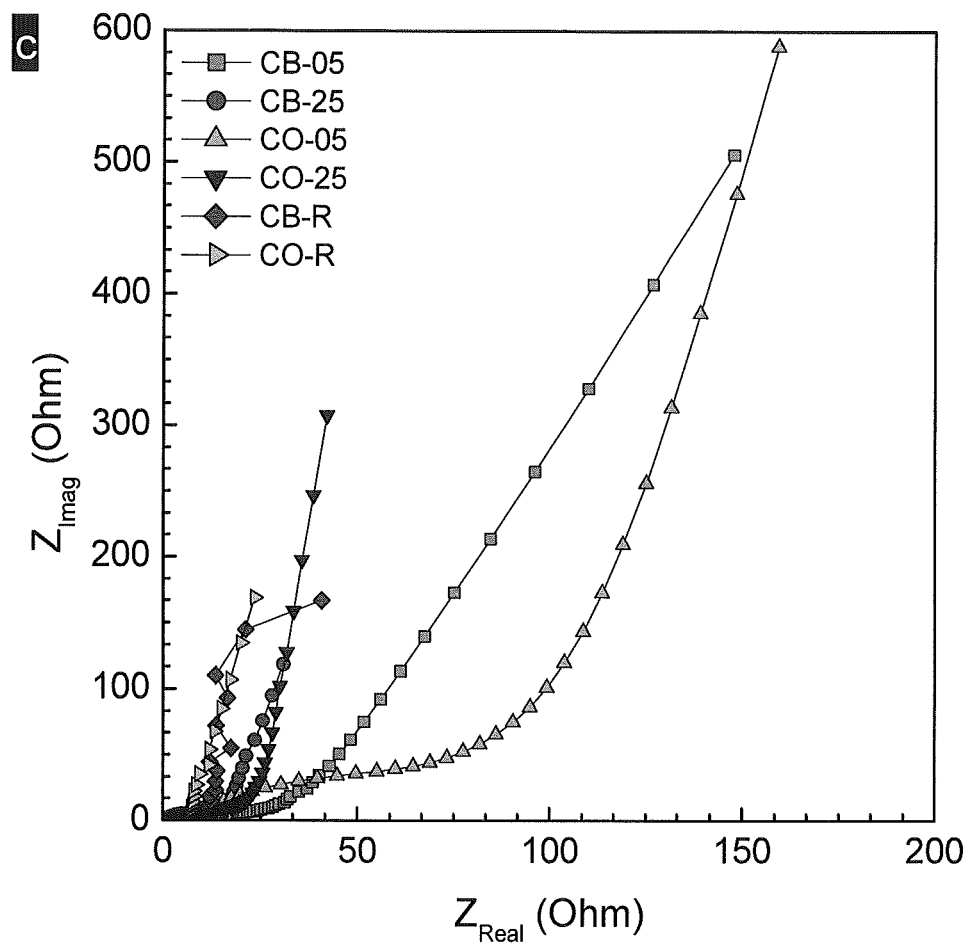
Figure 5D:
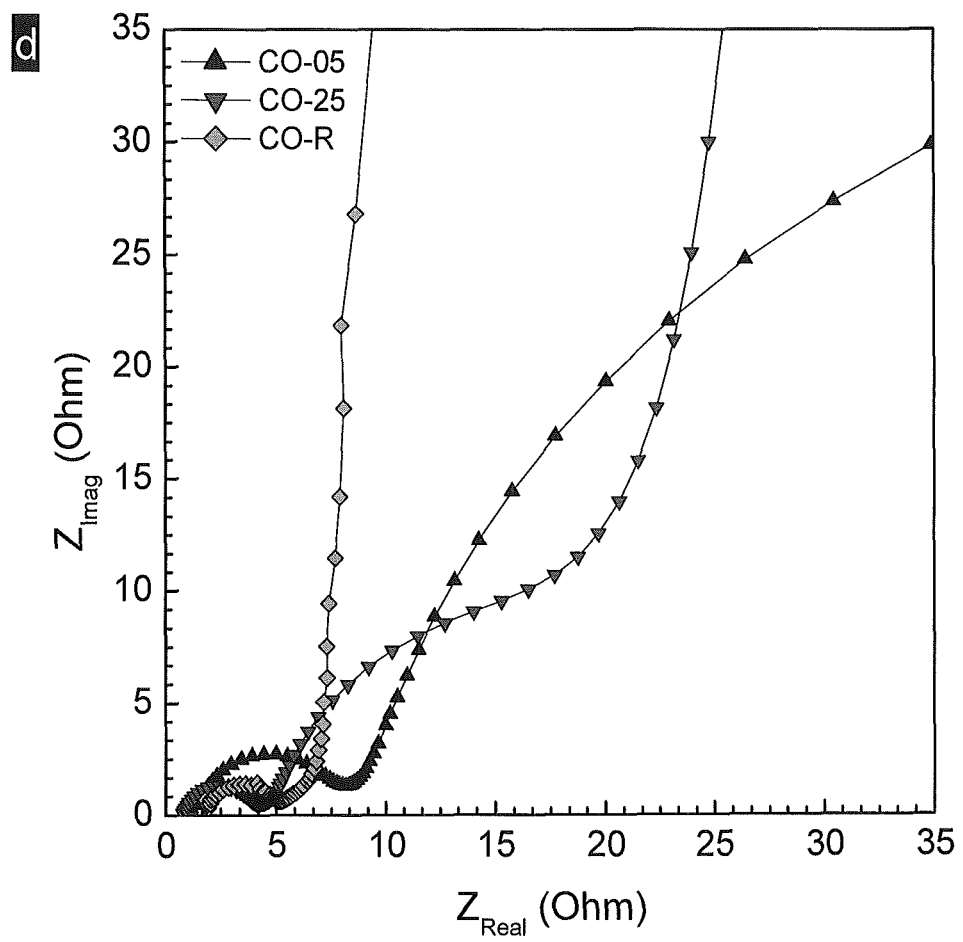
Figure 5E:
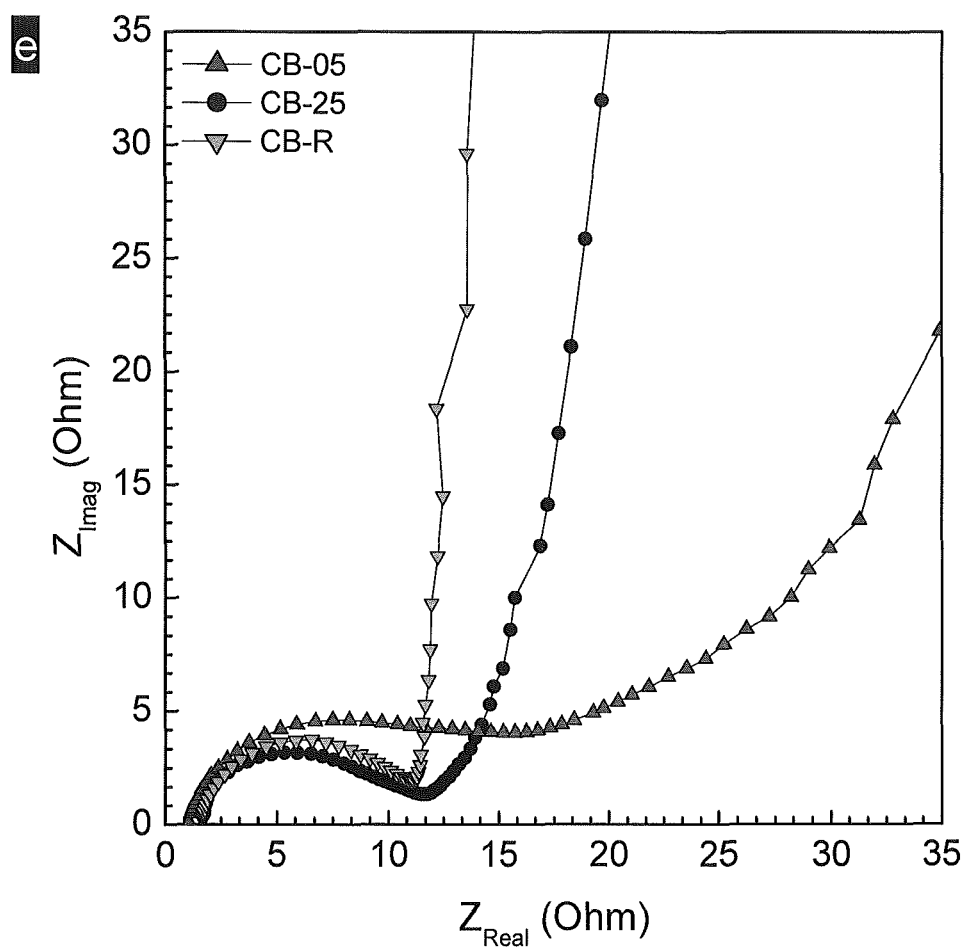

As shown in FIGS. 5a and 5b, the capacitance changes significantly as a function of CO and CB contents. Increasing the CO content in the pore walls of the nanocomposites resulted in retention of the large gravimetric capacitance for CO-25 at sweep rates as high as 200 mV·s$^{-1}$, in contrast to CO-5, FIG. 5b, and OMC-R (not shown). A constant capacitance over a large scan rate range is one of the advantages of carbon onions and displayed for higher CO concentrations (>25 wt %). The final nanocomposites having concentric graphitic carbon structures exhibit superior double layer capacitance performance when compared to pure mesoporous materials with pore walls having amorphous or turbostratic carbon. As shown in FIG. 5c, when comparing the Nyquist plots for materials with similar contents of CO and CB, the slope of the plot for CO is steeper than for CB, which indicates a larger charge transfer resistance, or a larger diffusion limitation, in the sample with CB. Also, higher loadings of the CO and CB lowered the equivalent series resistance of these composites, as shown by the semi-circles in the Nyquist plots in FIG. 5d. This shows that even at such high loadings, the mesoporous carbon (mortar) did not interrupt the CO particle connectivity (bricks), thereby permitting electron percolation, in comparison to the much larger and more segregated CB particles. In addition, CO-x composites show typical behavior for porous materials, in contrast to previously reported impedance data for the pure carbon onions (Portet et al., 2007, Ibid.).

Figure 5F:
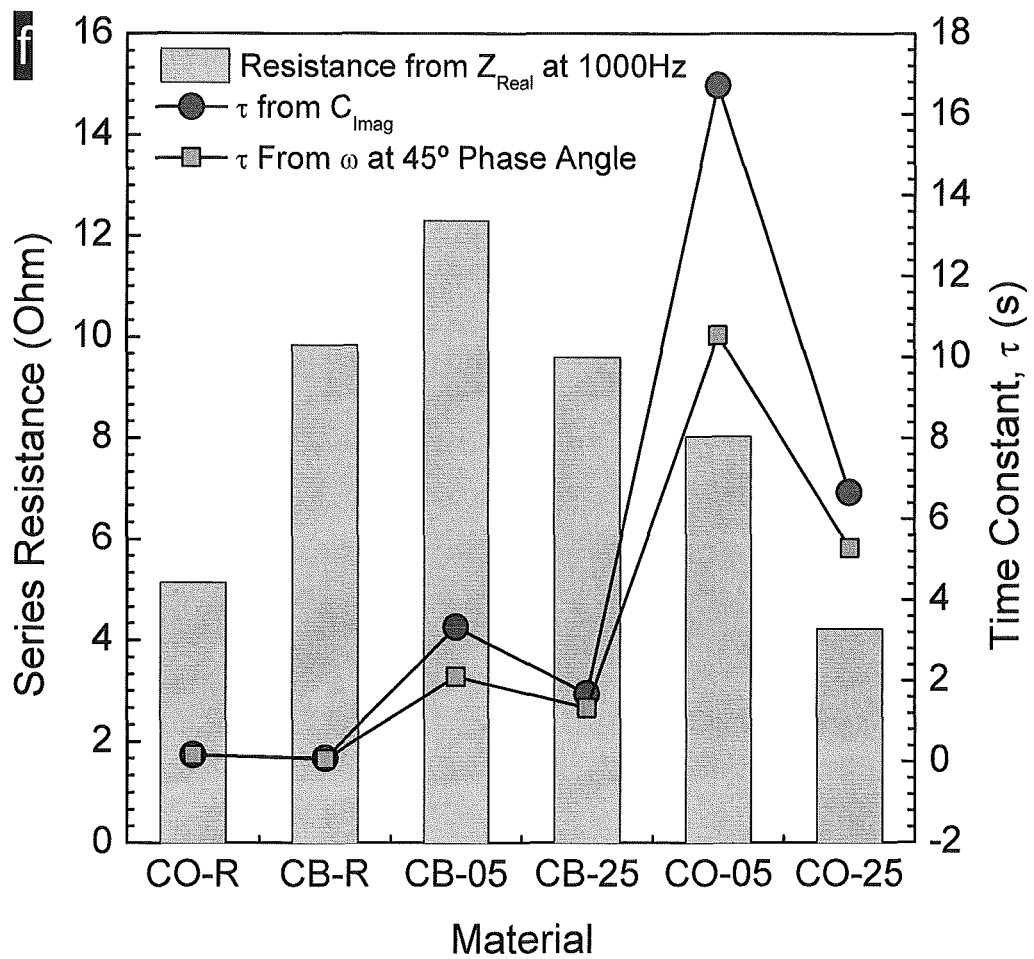
Figure 5G:
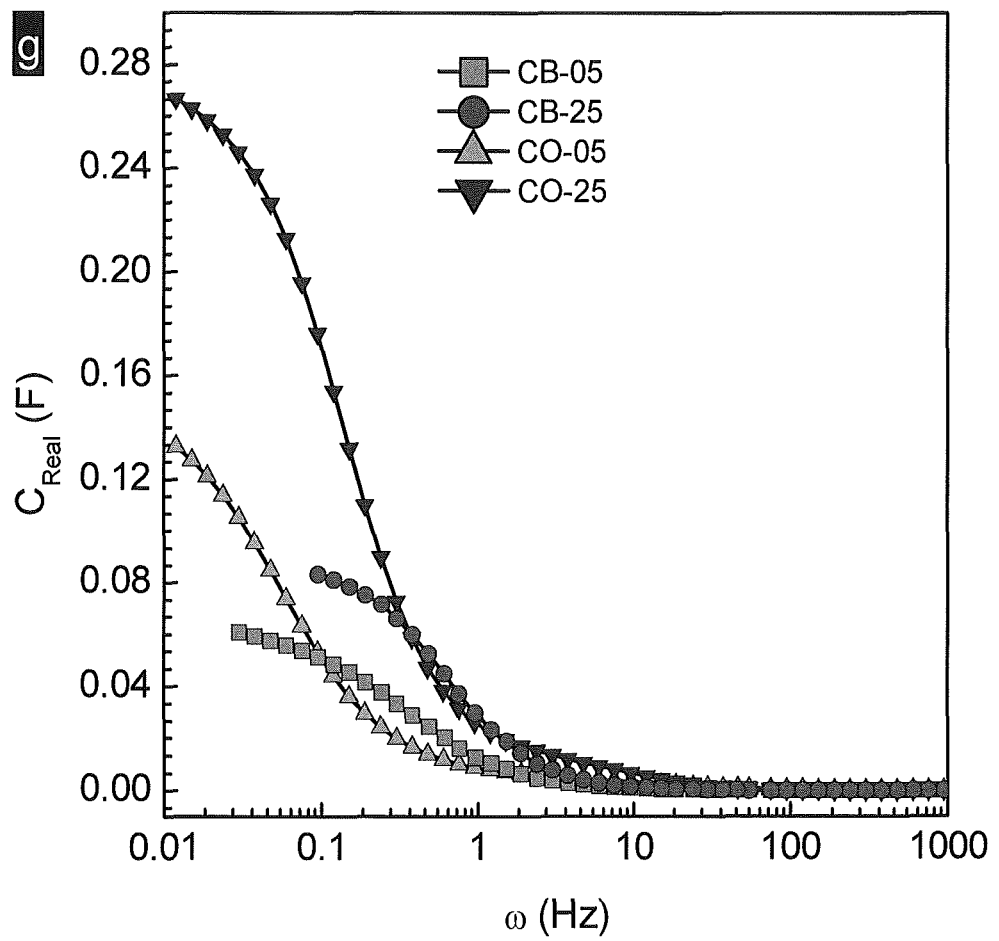
Figure 5H:
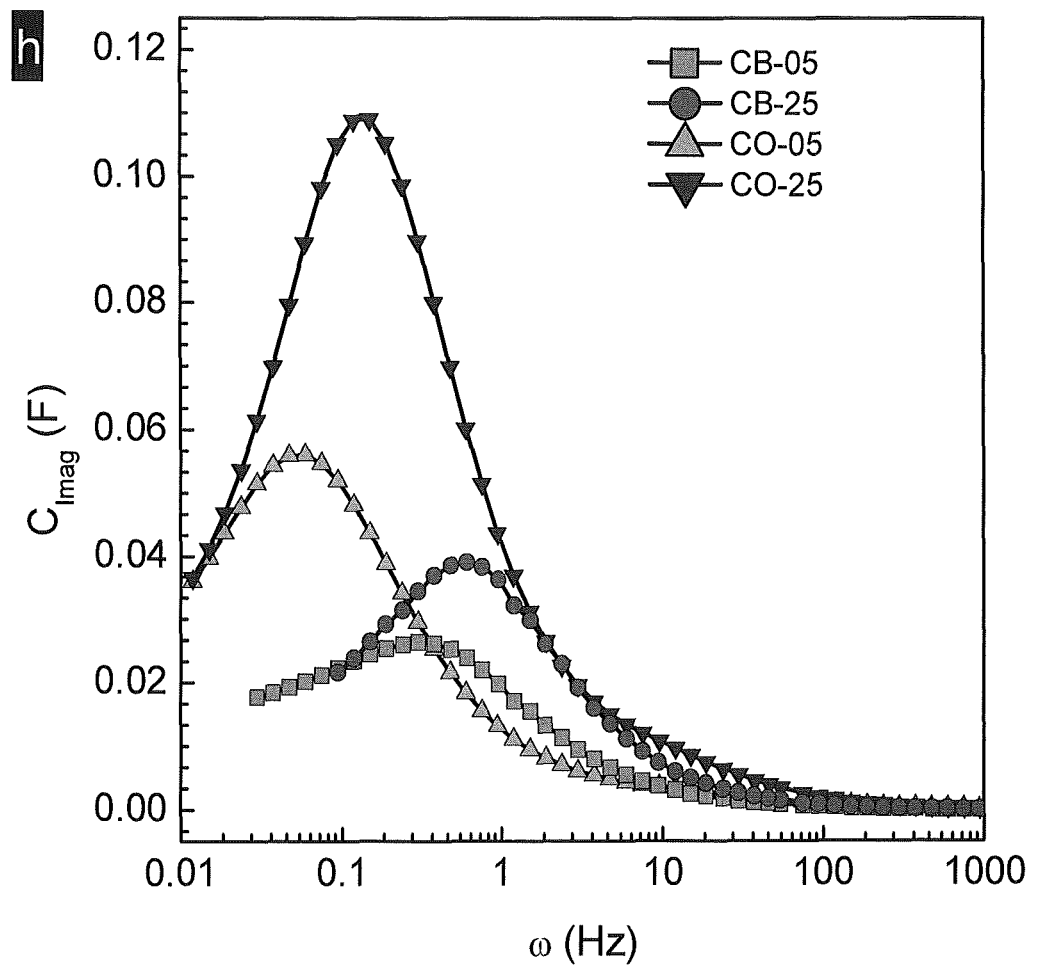

Furthermore, CO-x materials exhibited lower resistivity than the CB-x nanocomposites. This shows that even at such high loadings, the mesoporous carbon (mortar) did not interrupt the CO particle network (bricks) permitting electron percolation, in comparison to the much larger and more segregated CB particles. Also, the series resistance values for CO-25 and CB-25 were found to be similar to those of the carbon bricks used, CO—R and CB—R, respectively. In addition, CO-x composites clearly show semi-circle shapes at high frequencies in the Nyquist plots, in contrast to previously reported for the pure carbon onions (Portet et al., 2007, Ibid.) Phase angle versus frequency curves show capacitive behavior for these samples at low and high frequencies (not shown), whereas CB materials exhibit resistive behavior at intermediate frequencies where CO materials maintain their capacitive properties and without significant phase shifts based on CO contents. Electrodes with CO as an additive have a better capacitive behavior, as the real capacitance, $C_{Real}$, represents the actual capacitance of the cell (FIG. 5g). Also, the frequency response of the CO electrodes is higher than for the CB electrodes, indicating better rate capabilities. From the imaginary part of the capacitance, $C_{Imag}$ in FIG. 5h, the time constants ($\tau$) are calculated, as shown in FIG. 5f, illustrating a maximum value at a given frequency (Taberna et al., 2003, Ibid.) These values correlate well with the capacitance values calculated from the frequencies ($\omega$) at $-45°$ in the phase angle plots. Furthermore, all nanocomposites exhibit at least 10 times the capacitance of CO—R and CB—R samples (not shown), and consequently, higher time constants.

The above examples and surrounding disclosure have demonstrated that, by using the "brick and mortar" approach described above, it is possible to obtain highly conductive mesoporous materials that are highly adjustable in pore size distribution and other properties. The general formation mechanism of soft-templated OMCs, exemplified above, is in situ polymerization of resorcinol, phloroglucinol or glyoxal with formaldehyde in the presence of triblock copolymer surfactants in acidic conditions via enhanced hydrogen bonding and charge interactions. OMCs are finally obtained after phase separation of an organic polymer nanocomposite, annealing, and thermal treatments of films in non-oxidizing atmosphere. The surfaces of the carbon nano-onions (CO) and carbon black (CB) do not exhibit hydroxyl groups, nor surface charges to allow for the interaction between these and triblock copolymers. The above results show that precursors such as resorcinol can be physically adsorbed on their surfaces and provide the connectivity with the block copolymer templates according to the mechanisms shown in FIG. 1, microphase polymerization and separation occurring without significant solid-gel phase segregation.

The final gels are then converted into highly ordered mesoporous carbons binding the small and large agglomerates of COs or CBs following the proposed "brick and mortar" approach. This mesoporous carbon "mortar" acts as a binder for the carbon onions and as a mesoporous carbon film coating and binding the larger CB particles, in both cases forming stable porous frameworks. The final composites exhibit thermally stable mesopores and much higher electrical conductivity than pure phenolic resin-based carbons and without the need for graphitization, above 2000° C., thus preserving the mesopores. Furthermore, the method advantageously produces mesopores larger than 10 nm in diameter without relying on a sacrificial hard templating agent, such as silica particles.

Recently, it has been demonstrated that the ordered mesopores of soft-templated carbon materials can also be increased by mixing different triblock copolymers (Huang, Y. et al., Highly ordered mesoporous carbonaceous frameworks from a template of a mixed amphiphilic triblock-copolymer system of PEO-PPO-PEO and reverse PPO-PEO-PPO, *Chem-Asian J.*, 2, 1282-1289, (2007)). However, the final carbon product still exhibited pores smaller than 8 nm. In contrast, the present "brick and mortar" approach for the synthesis of mesoporous carbons resulted in materials with mesopores larger than previously reported for templated carbons. Moreover, the "brick and mortar" approach combined with the soft-template synthesis, as described herein, does not require mixtures of surfactants, and as previously mentioned, requires less preparation steps and avoids hazardous chemicals used in hard-templating methods.

The above results also show that it is possible to largely improve and tailor the electrochemical performance of low-temperature mesoporous carbons that, in general, lack sufficient ordering at the atomic level thereby having moderate electrical conductivity limiting their applications. The addition of conductive carbon nanoparticles, such as carbon blacks and carbon onions, to the synthesis gels of mesoporous carbons provides a methodology to tune the pore widths of the final materials, which is difficult to attain for pure resin based carbons. Such nanocomposites may further be prepared as powders, as monolithic structures, and as films. Furthermore, the ability to prepare soft-templated carbons with mesopores in the range of 10-20 nm without organic additives or using mixtures of surfactants represents a major economical advantage of the present method. Carbon materials with such large pores are highly attractive for the design of membranes, catalyst supports, enzyme immobilization, and assembly of future cells for energy storage applications, ranging from portable electronic devices to hybrid vehicles.

While there have been shown and described what are at present considered the preferred embodiments of the invention, those skilled in the art may make various changes and modifications which remain within the scope of the invention defined by the appended claims.

What is claimed is:

1. A conductive mesoporous carbon composite comprising conductive carbon nanoparticles embedded within a continuous mesoporous carbon matrix which is a continuous phase of a carbon material derived from a resin polymer by carbonization, wherein said conductive mesoporous carbon composite possesses at least a bimodal pore size distribution comprised of at least a first mode of mesopores and a second mode of mesopores, wherein said first mode of mesopores have pore walls constructed of the mesoporous carbon matrix and have a pore size ranging from 2 to 8 nm, and wherein said second mode of mesopores have pore walls delineated by surfaces of said conductive carbon nanoparticles being fused with each other and have a pore size of at least 10 nm and up to 50 nm, and wherein the conductive mesoporous carbon composite is in the form of a film having a thickness of up to 50 microns.

2. The mesoporous carbon composite of claim 1, wherein said second mode of mesopores contributes at least 80% of a total pore volume of the conductive mesoporous carbon composite.

3. The mesoporous carbon composite of claim 1, wherein said second mode of mesopores has a pore size of at least 12 nm and up to 50 nm.

4. The mesoporous carbon composite of claim 1, wherein said second mode of mesopores has a pore size of at least 15 nm and up to 50 nm.

5. The mesoporous carbon composite of claim 1, wherein said second mode of mesopores has a pore size of at least 10 nm and up to 20 nm.

6. The mesoporous carbon composite of claim 1, wherein said conductive carbon nanoparticles are comprised of carbon onion nanoparticles.

7. The mesoporous carbon composite of claim 1, wherein said conductive carbon nanoparticles are comprised of carbon black nanoparticles.

8. The mesoporous carbon composite of claim 1, wherein said conductive carbon nanoparticles are comprised of carbon nanotubes.

9. The mesoporous carbon composite of claim 1, wherein said conductive carbon nanoparticles are comprised of buckminsterfullerene nanoparticles.

10. The mesoporous carbon composite of claim 1, wherein said film has a thickness of up to 1 micron.

11. The mesoporous carbon composite of claim 1, wherein said film has a thickness of up to 100 nm.

12. The mesoporous carbon composite of claim 1, wherein said conductive mesoporous carbon composite further includes micropores that contribute up to 35% of a total pore volume, wherein said micropores have a pore size less than 2 nm.

13. The mesoporous carbon composite of claim 1, wherein said conductive mesoporous carbon composite is substantially absent of micropores.

14. A method for fabricating a conductive mesoporous carbon composite having conductive carbon nanoparticles contained within a continuous mesoporous carbon matrix which is a continuous phase of a carbon material derived from a resin polymer by carbonization, the method comprising subjecting a film of a precursor composition to a curing step followed by a carbonization step, the precursor composition comprising: (i) a templating component comprised of a block copolymer, (ii) a phenolic component, (iii) a crosslinkable aldehyde component, (iv) an acid catalyst, and (v) conductive carbon nanoparticles, wherein said carbonization step comprises heating the precursor composition at a carbonizing temperature of at least 300° C. and up to 2000° C. for sufficient time to convert the precursor composition to a conductive mesoporous carbon composite comprising said conductive carbon nanoparticles embedded within said continuous mesoporous carbon matrix, wherein said conductive mesoporous carbon composite possesses at least a bimodal pore size distribution comprised of at least a first mode of mesopores and a second mode of mesopores, wherein said first mode of mesopores have pore walls constructed of the mesoporous carbon matrix and have a pore size ranging from 2 to 8 nm, and wherein said second mode of mesopores have pore walls delineated by surfaces of said conductive carbon nanoparticles being fused with each other and have a pore size of at least 10 nm and up to 50 nm, and wherein the conductive mesoporous carbon composite is in the form of a film having a thickness of up to 50 microns.

15. The method of claim 14, wherein said carbonizing temperature is at least 300° C. and up to 1500° C.

16. The method of claim 14, wherein said carbonizing temperature is at least 300° C. and up to 1000° C.

17. The method of claim 14, wherein said carbonizing temperature is at least 300° C. and up to 900° C.

18. The method of claim 14, wherein said carbonizing temperature is at least 300° C. and up to 850° C.

19. The method of claim 14, wherein said carbonizing temperature is at least 300° C. and up to 800° C.

20. The method of claim 14, wherein said curing step comprises heating the precursor composition at a temperature up to 200° C. for an amount of time that permits curing of the precursor composition.

21. The method of claim 14, wherein said block copolymer comprises a poloxamer triblock copolymer.

22. The method of claim 14, wherein said phenolic component is comprised of at least one phenolic compound.

23. The method of claim 22, wherein said phenolic compound is selected from the group consisting of phenol, catechol, resorcinol, dihydroquinone, phloroglucinol, cresols, halophenols, aminophenols, hydroxybenzoic acids, and dihydroxybiphenyls.

24. The method of claim 14, wherein said crosslinkable aldehyde component is selected from organoaldehydes and organodialdehydes.

25. The method of claim 14, wherein said crosslinkable aldehyde component is selected from formaldehyde and glyoxal.

26. The method of claim 14, wherein said conductive carbon nanoparticles are included in an amount of 5 to 95 percent by weight of the conductive carbon nanoparticles and phenolic component.

27. The method of claim 14, wherein said conductive carbon nanoparticles are included in an amount of 10 to 90 percent by weight of the conductive carbon nanoparticles and phenolic component.

28. The method of claim 14, wherein said conductive carbon nanoparticles are included in an amount of 15 to 85 percent by weight of the conductive carbon nanoparticles and phenolic component.

29. The method of claim 14, wherein said conductive carbon nanoparticles are included in an amount of 20 to 80 percent by weight of the conductive carbon nanoparticles and phenolic component.

30. The method of claim 14, wherein said conductive carbon nanoparticles are included in an amount of 25 to 75 percent by weight of the conductive carbon nanoparticles and phenolic component.

31. The method of claim 14, wherein said second mode of mesopores contributes at least 80% of a total pore volume of the conductive mesoporous carbon composite.

32. The method of claim 14, wherein said second mode of mesopores has a pore size of at least 12 nm and up to 50 nm.

33. The method of claim 14, wherein said second mode of mesopores has a pore size of at least 15 nm and up to 50 nm.

34. The method of claim 14, wherein said second mode of mesopores has a pore size of at least 10 nm and up to 20 nm.

35. The method of claim 14, wherein said conductive carbon nanoparticles are comprised of carbon onion nanoparticles.

36. The method of claim 14, wherein said conductive carbon nanoparticles are comprised of carbon black nanoparticles.

37. The method of claim 14, wherein said conductive carbon nanoparticles are comprised of carbon nanotubes.

38. The method of claim 14, wherein said conductive carbon nanoparticles are comprised of buckminsterfullerene nanoparticles.

* * * * *